US011467667B2

(12) United States Patent
Novich et al.

(10) Patent No.: US 11,467,667 B2
(45) Date of Patent: Oct. 11, 2022

(54) SYSTEM AND METHOD FOR HAPTIC STIMULATION

(71) Applicant: NeoSensory, Inc., Houston, TX (US)

(72) Inventors: Scott Novich, Houston, TX (US);
Mark Strawn, Houston, TX (US);
Yongchenn Low, Houston, TX (US);
Jose Balderas, Houston, TX (US);
Joseph Marquis, Houston, TX (US);
David Eagleman, Houston, TX (US)

(73) Assignee: NeoSensory, Inc., Palo Alto, CA (US)

( * ) Notice: Subject to any disclaimer, the term of this patent is extended or adjusted under 35 U.S.C. 154(b) by 111 days.

(21) Appl. No.: 17/033,433

(22) Filed: Sep. 25, 2020

(65) Prior Publication Data

US 2021/0089130 A1    Mar. 25, 2021

Related U.S. Application Data

(60) Provisional application No. 62/905,575, filed on Sep. 25, 2019.

(51) Int. Cl.
*G06F 3/01* (2006.01)
*G08B 6/00* (2006.01)
(Continued)

(52) U.S. Cl.
CPC .............. *G06F 3/016* (2013.01); *G06F 1/163* (2013.01); *G08B 6/00* (2013.01); *H04R 1/023* (2013.01); *H04R 2410/01* (2013.01)

(58) Field of Classification Search
CPC .......... G06F 3/016; G06F 1/163; G06F 3/014; G08B 6/00; H04R 1/023; H04R 2410/01; H04R 2410/07; H04R 2460/13
See application file for complete search history.

(56) References Cited

U.S. PATENT DOCUMENTS 3,342,923 A    9/1967   Henley
4,255,801 A    3/1981   Ode et al.
(Continued)

FOREIGN PATENT DOCUMENTS

CN    104011794 A    8/2014
CN    105739674 A    7/2016
(Continued)

OTHER PUBLICATIONS

Horvath et al., FingerSight: Fingertip Haptic Sensing of the Visual Environment, Mar. 6, 2014, IEEE, vol. 2, 2014 (Year: 2014).
(Continued)

*Primary Examiner* — Fekadeselassie Girma
*Assistant Examiner* — Mancil Littlejohn, Jr.
(74) *Attorney, Agent, or Firm* — Jeffrey Schox; Caitlin Ploch

(57) ABSTRACT

A system for haptic stimulation includes: an actuation subsystem having a set of actuators, a support subsystem, a rigid housing, a sensor subsystem, a control module, and an electrical subsystem. A method for manufacturing a system for haptic stimulation includes performing a set of injection molding processes to form the support subsystem and/or the rigid housing; integrating the actuation subsystem within the support subsystem; and coupling the rigid housing to the support subsystem.

19 Claims, 12 Drawing Sheets

(51) Int. Cl.
*G06F 1/16* (2006.01)
*H04R 1/02* (2006.01)

(56) References Cited

U.S. PATENT DOCUMENTS

| | | | |
|---|---|---|---|
| 4,354,064 A | 10/1982 | Scott | |
| 4,581,491 A | 4/1986 | Boothroyd | |
| 4,665,494 A | 5/1987 | Tanaka et al. | |
| 4,926,879 A | 5/1990 | Sevrain et al. | |
| 5,553,148 A | 9/1996 | Werle | |
| 5,655,271 A | 8/1997 | Maxwell-Trumble et al. | |
| 6,027,463 A | 2/2000 | Moriyasu | |
| 6,155,995 A | 12/2000 | Lin | |
| 6,272,466 B1 | 8/2001 | Harada et al. | |
| 6,295,703 B1 | 10/2001 | Adams et al. | |
| 6,671,618 B2 | 12/2003 | Hoisko | |
| 7,146,218 B2 | 12/2006 | Esteller et al. | |
| 7,222,075 B2 | 5/2007 | Petrushin | |
| 7,232,948 B2 | 6/2007 | Zhang | |
| 7,921,069 B2 | 4/2011 | Canny et al. | |
| 7,979,146 B2 | 7/2011 | Ullrich et al. | |
| 8,005,681 B2 | 8/2011 | Hovestadt et al. | |
| 8,068,025 B2 | 11/2011 | Devenyi et al. | |
| 8,588,464 B2 | 11/2013 | Albertson et al. | |
| 8,724,841 B2 | 5/2014 | Bright et al. | |
| 8,754,757 B1 | 6/2014 | Ullrich et al. | |
| 8,952,888 B2 | 2/2015 | Van Den Eerenbeemd et al. | |
| 9,019,087 B2 | 4/2015 | Bakircioglu et al. | |
| 9,298,260 B2 | 3/2016 | Karaoguz et al. | |
| 9,317,116 B2 | 4/2016 | Ullrich et al. | |
| 9,324,320 B1 | 4/2016 | Stolcke et al. | |
| 9,345,433 B1 | 5/2016 | Shinozuka et al. | |
| 9,443,410 B1 | 9/2016 | Constien | |
| 9,474,683 B1 | 10/2016 | Mortimer et al. | |
| 9,613,619 B2 | 4/2017 | Lev-Tov et al. | |
| 9,626,845 B2 | 4/2017 | Eagleman et al. | |
| 9,659,384 B2 | 5/2017 | Shaji et al. | |
| 9,714,075 B2 | 7/2017 | Watkins et al. | |
| 9,735,364 B2 | 8/2017 | Cheng et al. | |
| 9,905,090 B2 | 2/2018 | Ullrich et al. | |
| 9,987,962 B1 | 6/2018 | Salter et al. | |
| 10,455,320 B2* | 10/2019 | Ralph | H04R 1/04 |
| 10,497,246 B2* | 12/2019 | Arnold | A61B 5/7264 |
| 10,642,362 B2 | 5/2020 | Eagleman et al. | |
| 2002/0111737 A1 | 8/2002 | Hoisko | |
| 2002/0194002 A1 | 12/2002 | Petrushin | |
| 2003/0025595 A1 | 2/2003 | Langberg | |
| 2003/0067440 A1 | 4/2003 | Rank | |
| 2003/0117371 A1 | 6/2003 | Roberts et al. | |
| 2003/0151597 A1 | 8/2003 | Roberts et al. | |
| 2003/0158587 A1 | 8/2003 | Esteller et al. | |
| 2005/0113167 A1 | 5/2005 | Buchner et al. | |
| 2007/0041600 A1 | 2/2007 | Zachman | |
| 2007/0242040 A1 | 10/2007 | Ullrich et al. | |
| 2008/0120029 A1 | 5/2008 | Zelek et al. | |
| 2008/0140422 A1 | 6/2008 | Hovestadt et al. | |
| 2008/0170118 A1 | 7/2008 | Albertson et al. | |
| 2009/0006363 A1 | 1/2009 | Canny et al. | |
| 2009/0012638 A1 | 1/2009 | Lou | |
| 2009/0096632 A1 | 4/2009 | Ullrich et al. | |
| 2010/0249637 A1 | 9/2010 | Walter et al. | |
| 2010/0302033 A1 | 12/2010 | Devenyi et al. | |
| 2011/0061017 A1 | 3/2011 | Ullrich et al. | |
| 2011/0063208 A1 | 3/2011 | Van et al. | |
| 2011/0202155 A1 | 8/2011 | Ullrich et al. | |
| 2011/0202337 A1 | 8/2011 | Fuchs et al. | |
| 2011/0221694 A1 | 9/2011 | Karaoguz et al. | |
| 2011/0319796 A1 | 12/2011 | Campdera | |
| 2012/0023785 A1 | 2/2012 | Barnes et al. | |
| 2013/0102937 A1 | 4/2013 | Ehrenreich et al. | |
| 2013/0218456 A1 | 8/2013 | Zelek et al. | |
| 2013/0265286 A1 | 10/2013 | Da Costa et al. | |
| 2014/0064516 A1 | 3/2014 | Cruz-Hernandez et al. | |
| 2014/0363138 A1 | 12/2014 | Coviello et al. | |
| 2015/0025895 A1 | 1/2015 | Schildbach | |
| 2015/0038887 A1 | 2/2015 | Piccirillo | |
| 2015/0070150 A1 | 3/2015 | Levesque et al. | |
| 2015/0120289 A1 | 4/2015 | Lev-Tov et al. | |
| 2015/0161994 A1 | 6/2015 | Tang et al. | |
| 2015/0161995 A1 | 6/2015 | Sainath et al. | |
| 2015/0227204 A1 | 8/2015 | Gipson et al. | |
| 2015/0230524 A1 | 8/2015 | Stevens et al. | |
| 2015/0272815 A1 | 10/2015 | Kitchens | |
| 2015/0294597 A1 | 10/2015 | Rizzo | |
| 2015/0305974 A1 | 10/2015 | Ehrenreich et al. | |
| 2015/0351999 A1 | 12/2015 | Brouse | |
| 2015/0356889 A1* | 12/2015 | Schwartz | G09B 21/009 340/4.12 |
| 2016/0012688 A1 | 1/2016 | Eagleman et al. | |
| 2016/0026253 A1 | 1/2016 | Bradski et al. | |
| 2016/0027338 A1 | 1/2016 | Ebeling et al. | |
| 2016/0049915 A1 | 2/2016 | Wang et al. | |
| 2016/0098844 A1 | 4/2016 | Shaji et al. | |
| 2016/0098987 A1 | 4/2016 | Stolcke et al. | |
| 2016/0103590 A1* | 4/2016 | Vu | G06F 1/1698 715/748 |
| 2016/0187987 A1 | 6/2016 | Ullrich et al. | |
| 2016/0242986 A1 | 8/2016 | Nagata et al. | |
| 2016/0254454 A1 | 9/2016 | Cheng et al. | |
| 2016/0255944 A1 | 9/2016 | Baranski et al. | |
| 2016/0284189 A1 | 9/2016 | Constien | |
| 2016/0292856 A1 | 10/2016 | Niemeijer et al. | |
| 2016/0297611 A1 | 10/2016 | Williams et al. | |
| 2016/0358429 A1 | 12/2016 | Ullrich et al. | |
| 2016/0367190 A1 | 12/2016 | Vaitaitis | |
| 2017/0169673 A1 | 6/2017 | Billington et al. | |
| 2017/0206889 A1 | 7/2017 | Lev-Tov et al. | |
| 2017/0213568 A1 | 7/2017 | Foshee | |
| 2017/0239130 A1 | 8/2017 | Rizzo | |
| 2017/0290736 A1 | 10/2017 | Idris | |
| 2017/0294086 A1* | 10/2017 | Kerdemelidis | G08B 6/00 |
| 2017/0348184 A1 | 12/2017 | Pisharodi et al. | |
| 2018/0284894 A1 | 10/2018 | Raut et al. | |
| 2018/0303702 A1 | 10/2018 | Novich et al. | |
| 2018/0374264 A1 | 12/2018 | Gatson et al. | |
| 2019/0045296 A1 | 2/2019 | Ralph | |
| 2019/0337451 A1 | 11/2019 | Bacchus et al. | |

FOREIGN PATENT DOCUMENTS

| | | |
|---|---|---|
| WO | 2008106698 A1 | 9/2008 |
| WO | 2012069429 A1 | 5/2012 |

OTHER PUBLICATIONS

Jones et al., Development of a Tactile Vest, 2004, IEEE, 0-7695-2112-6/04 (Year: 2004).

Nakamura et al., An Actuator for the Tactile Vest—a Torso-Based Haptic Device, 2003, IEEE, 0-7695-1890-7/03 (Year: 2003).

Paneels et al., What's Around Me? Multi-Actuator Haptic Feedback on the Wrist, Apr. 14-18, 2013, IEEE, 978-1-4799-0088-6/13, pp. 407-412 (Year: 2013).

Tapson et al., The Feeling of Color: A Haptic Feedback Device for the Visually Disabled, 2008, IEEE, 978-1-4244-2879-3/08, pp. 381-384 (Year: 2008).

"Plant, Geoff, "Training in the use of the Tactaid VII: A case study", KTH Computer Science and Communication (STL-QPSR), 1994, vol. 35, No. 1, pp. 091-102.", Jul. 24, 2017 00:00:00.0.

"Neosensory Buzz" (Neosensory) Aug. 17, 2020 (Aug. 17, 2020).

"The Wristband That Gives You Superpowers" (NEO.LIFE) Jan. 10, 2019 (Jan. 10, 2019) 1-16.

* cited by examiner

Method of manufacture 200

FIGURE 4A
FIGURE 4B
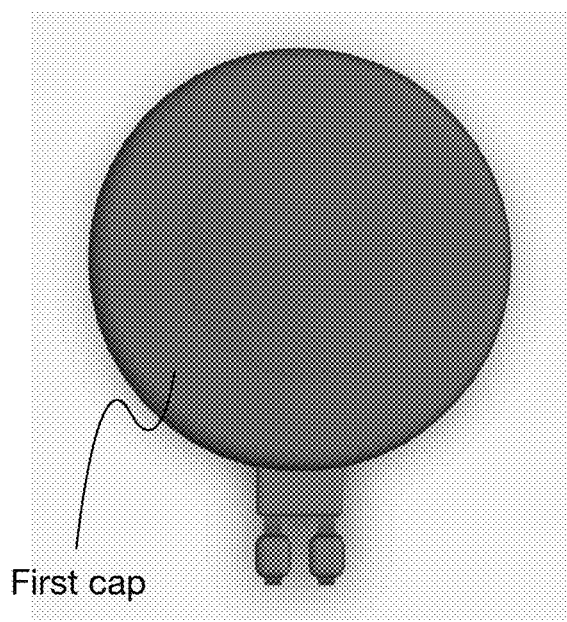
FIGURE 4C

SYSTEM AND METHOD FOR HAPTIC STIMULATION

CROSS-REFERENCE TO RELATED APPLICATIONS

This application claims the benefit of U.S. Provisional Application No. 62/905,575, filed 25 Sep. 2019, which is incorporated in its entirety by this reference.

TECHNICAL FIELD

This invention relates generally to the sensory output field, and more specifically to a new and useful haptic stimulation system and method of manufacture in the sensory output field.

BACKGROUND

Haptic stimulation (equivalently referred to herein as tactile stimulation) of a user based on audio input(s) has been shown to have several advantages in various use cases. For individuals having hearing loss (e.g., partial hearing loss, full hearing loss, etc.), for instance, haptic stimulation can be used to provide and/or supplement important information typically conveyed through audio, which the user might otherwise miss or have difficulty interpreting. This can not only have safety benefits to the individual (e.g., to hear important sounds such as alarms, traffic, knocking, etc.), but can help the user comprehend his or her environment, engage in conversation, receive information, and/or otherwise interact with the world. For hearing-abled individuals, haptic stimulation can provide an additional level of immersion for the user in various environments (e.g., at concerts, in gaming, etc.) and be used in various ways to provide or supplement information. Conventional systems and methods for applying haptic stimulation, however, typically provide stimulation which is difficult to sense and be interpreted by the user.

Thus, there is a need in the sensory output field to create an improved system and method for conveying audio information to a user through haptic stimulation.

BRIEF DESCRIPTION OF THE FIGURES

FIGS. 4A-4C depict a variation of an actuator.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
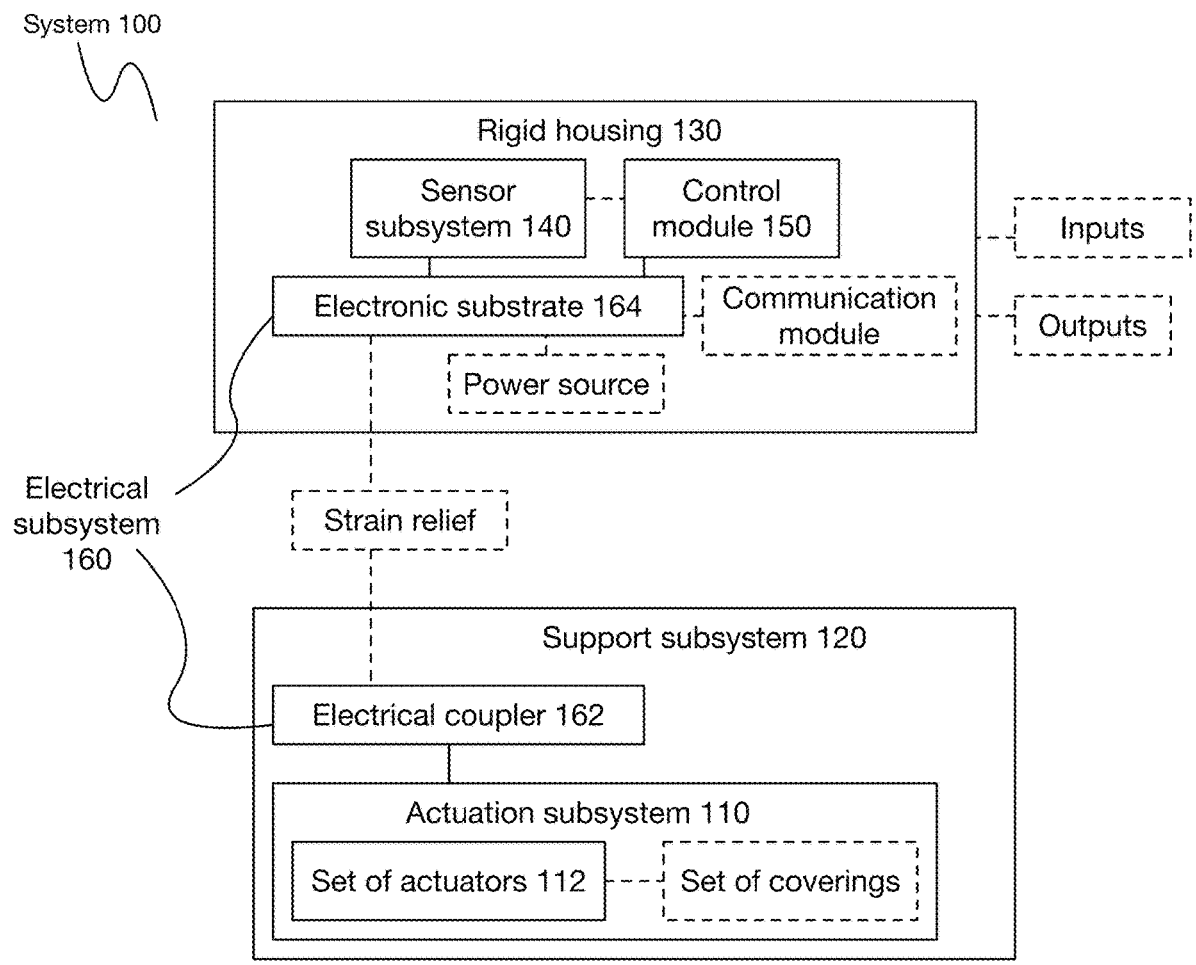
FIG. 1 depicts a schematic representation of the system 100.

As shown in FIG. 1, a system 100 for haptic stimulation includes: an actuation subsystem no having a set of actuators 112, a support subsystem 120, a rigid housing 130, a sensor subsystem 140, a control module 150, and an electrical subsystem 160. Additionally or alternatively, the system 100 can include, define, and/or interface with any or all of: a strain relief, a power source, a set of inputs, a set of outputs, a user device and/or a client application executing on a user device, and/or any other suitable component(s). Further additionally or alternatively, the system 100 can include any or all of the systems, component, embodiments, and/or examples described in any or all of: U.S. application Ser. No. 14/750,626, filed 25 Jun. 2015, U.S. application Ser. No. 15/661,934, filed 27 Jul. 2017, U.S. application Ser. No. 15/696,997, filed 6 Sep. 2017, U.S. application Ser. No. 15/795,054, filed 26 Oct. 2017, and U.S. application Ser. No. 15/959,042, filed 20 Apr. 2018, filed 20 Apr. 2018, each of which is incorporated herein in its entirety by this reference.

Figure 2:
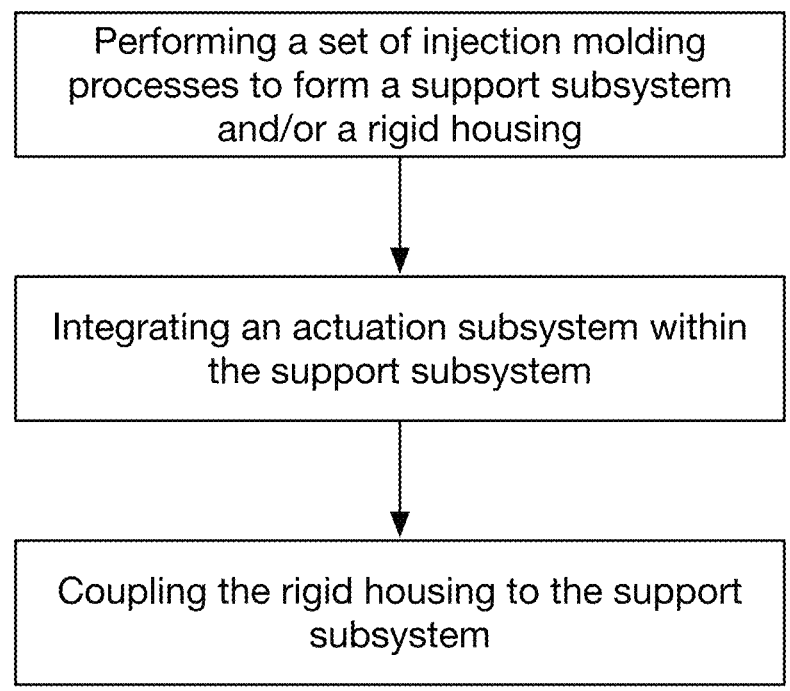
FIG. 2 depicts a schematic representation of the method for manufacture 200.

As shown in FIG. 2, a method 200 of manufacture includes performing a set of injection molding processes to form the support subsystem and/or the rigid housing; integrating the actuation subsystem within the support subsystem; and coupling the rigid housing to the support subsystem. Additionally or alternatively, the method 200 can include any or all of: applying a protective structure to each of the set of actuators in the actuation subsystem; forming the rigid housing; integrating an electronics subsystem within the rigid housing and/or the support subsystem; and/or any other suitable processes performed in any suitable order.

Figure 10:
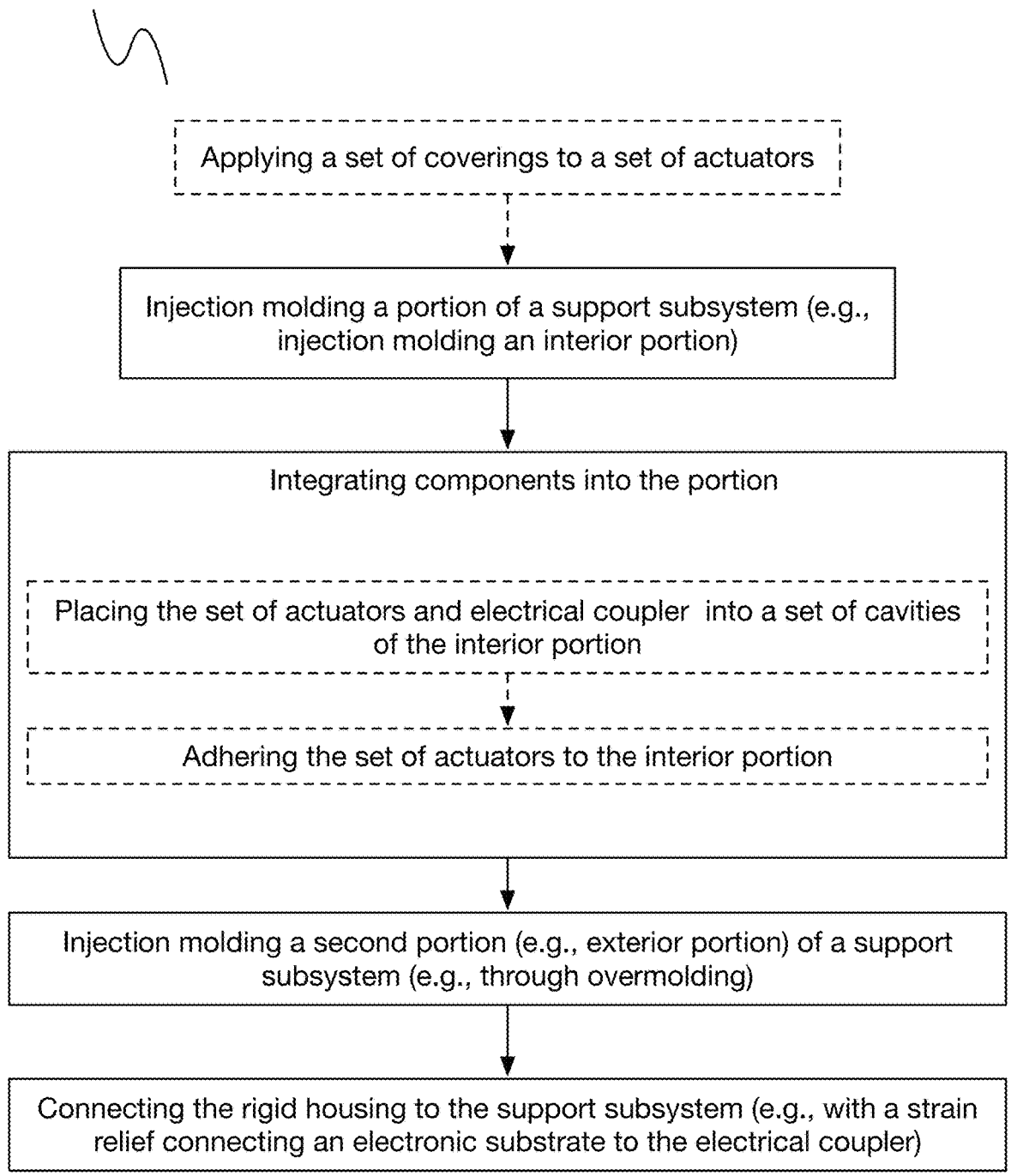
FIG. 10 depicts a schematic representation of a variation of the method for manufacture 200.

In a variation of the method 200 shown in FIG. 10, the method 200 includes injection molding a portion of a support subsystem; integrating system components into the portion; injection molding a second portion of the support subsystem; and connecting a rigid housing to the support subsystem. The method 200 can additionally include applying a set of coverings to each of the set of actuators, and/or any other suitable process(es).

Further additionally or alternatively, the method 200 can include any or all of the methods, processes, embodiments, and/or examples described in any or all of: U.S. application Ser. No. 14/750,626, filed 25 Jun. 2015, U.S. application Ser. No. 15/661,934, filed 27 Jul. 2017, U.S. application Ser. No. 15/696,997, filed 6 Sep. 2017, U.S. application Ser. No. 15/795,054, filed 26 Oct. 2017, and U.S. application Ser. No. 15/959,042, filed 20 Apr. 2018, filed 20 Apr. 2018, each of which is incorporated herein in its entirety by this reference.

2. Benefits

The system and method for haptic stimulation can confer several benefits over current systems and methods.

First, in some variations, the system and/or method confers the benefit of enabling haptic stimulation to be individually felt at each of a set of haptic actuators, which can function to enable information associated with each of the set of haptic actuators to be discernable and interpretable. In specific examples, for instance, haptic coupling between adjacent actuators is minimized and/or eliminated based on any or all of: mechanical isolation (e.g., damping through silicone separation between adjacent actuators; damping through one or more coverings of the actuators such as fabric; etc.); signals processing and/or programming of actuation; properties of the actuators (e.g., selected frequency of vibration for each actuator); and/or based on any other suitable properties.

Second, in some variations, additional or alternative to those described above, the system and/or method confers the benefit of maintaining a proper placement of the system on the user's wrist such that the system is able to provide haptic stimulation at a partial or full circumference of the user's wrist. In specific examples, a notch or other support feature is present in a wristband device to prevent rotation and/or slippage of the wristband during wear.

Third, in some variations, additional or alternative to those described above, the system and/or method confers the benefit of enabling a robust connection between flexible and rigid components in order to conform to and provide comfort to the user, while protecting electronic components. In specific examples, for instance, a coupling between a rigid body and flexible wristband is configured such that the electronic components (e.g., PCBs) are not pulled on upon manipulation of the flexible band.

Fourth, in some variations, additional or alternative to those described above, the system and/or method confers the benefit of eliminating and/or reducing sound that reaches a microphone from a set of actuators. In a specific example, a microphone of the system is not directly coupled to a wristband housing the actuators, such that the majority of sound generated by the actuators that reaches the microphone has to travel outside of the system and re-enter rather than be propagated directly through the wristband hardware.

Fifth, in some variations, additional or alternative to those described above, the system and/or method confers the benefit of preventing damage (e.g., through ingress of wristband material, crushing, etc.) to a set of actuators during wristband manufacture. In a specific example, for instance, each of the set of actuators is surrounded by a set of custom caps prior to being integrated with any part of the wristband.

3. System

As shown in FIG. 1, a system 100 for haptic stimulation includes: an actuation subsystem no having a set of actuators 112, a support subsystem 120, a rigid housing 130, a sensor subsystem 140, a control module 150, and an electrical subsystem 160. Additionally or alternatively, the system 100 can include any or all of: a strain relief, a power source, set of inputs, set of outputs, user device, client application executing on a user device, and/or any other suitable component(s). The system 100 functions to apply haptic stimulation to a user.

The system 100 preferably functions to apply haptic stimulation to a user based on audio information, such as any or all of: audio surrounding the user (e.g., in an environment of the user); particular and/or predetermined audio types (e.g., conversational audio; audio associated with a particular source and/or individual; music; important and/or emergency sounds such as alarms, beeps, ringing, knocking, traffic, and sirens; audio selected and/or desired by the user; audio associated with entertainment; audio of a predetermined frequency or range of frequencies (e.g., above a predetermined threshold, below a predetermined threshold, within a predetermined range of values, etc.); audio of a predetermined value or range of values of energy and/or amplitude and/or power (e.g., above a predetermined threshold, below a predetermined threshold, within a predetermined range of values, etc.); audio from a predetermined direction and/or location; an audio recording and/or audio stream (e.g., received at the system 100 from a user device and/or client application); audio corresponding to particular phonology and/or linguistics (e.g., particular phonemes, words, letters, phrases, etc.); and/or any other suitable audio. Additionally or alternatively, the system 100 can function to apply haptic stimulation to a user based on any other information, such as any or all of: visual information, textual and/or coded information, olfactory information, tactile information, and/or any other suitable information.

Further additionally or alternatively, the system 100 can function to perform any or all of: enabling comfortable placement and/or placement with a maintained position or orientation on a body region of the user (e.g., on a user's wrist without rotating); minimizing and/or eliminating unwanted audio (e.g., from vibration of the actuators, based on user preferences, etc.) from being processed and/or provided through haptic stimulation; providing interpretable haptic stimulation through a set of multiple actuators (e.g., through damping and/or isolation of haptic stimulation between adjacent actuators); and/or can perform any other suitable function.

The system 100 is preferably manufactured based on a method 200 as described below, but can additionally or alternatively be manufactured based on any suitable processes. The system 100 can be associated with any suitable method of use, such as any or all of the methods, processes, embodiments, and examples as described in any or all of: U.S. application Ser. No. 14/750,626, filed 25 Jun. 2015, U.S. application Ser. No. 15/661,934, filed 27 Jul. 2017, U.S. application Ser. No. 15/696,997, filed 6 Sep. 2017, U.S. application Ser. No. 15/795,054, filed 26 Oct. 2017, and U.S. application Ser. No. 15/959,042, filed 20 Apr. 2018, filed 20 Apr. 2018, each of which is incorporated herein in its entirety by this reference.

3.1 System: Actuation Subsystem 110

The system includes an actuation subsystem 110, which functions to apply haptic (e.g., vibratory) stimulation to a user. The haptic stimulation is preferably determined and provided based on audio data (e.g., audio from an environment of the user), but can additionally or alternatively be determined based on any other suitable types of information (e.g., visual information). The actuation subsystem 110 can additionally or alternatively function to perform any or all of: providing detectable stimulation (e.g., which is still isolated to particular locations); providing stimulation and identifiable locations (e.g., at the location of the actuator, at locations in-between actuators for providing haptic illusion stimulation, etc.); provide haptic stimulation according to prescribed stimulation patterns; and/or perform any other suitable function(s).

The actuation subsystem no includes a set of actuators 112, which can individually and/or collectively function to convey information (e.g., audio information, visual information, etc.) through haptic stimulation to a body region of the user. The body region preferably includes a partial or full circumference of a wrist of the user, but can additionally or alternatively include any or all of: a hand (e.g., in a glove form factor), arm (e.g., in a sleeve form factor, in an armband form factor, in a cast and/or sling form factor, etc.), finger (e.g., in a ring form factor), leg (e.g., in a knee brace form factor, in a compression sleeve form factor, etc.), foot (e.g., in a shoe form factor, in a sock form factor, etc.), torso (e.g., in a vest form factor), neck (e.g., in a scarf form factor, in a neck wrap form factor, etc.), head (e.g., in a hat form factor, in a headband form factor, etc.), ankle (e.g., in an anklet form factor), and/or any other suitable body part or body region of the user.

The set of actuators 112 can include one or more of: an actuator (e.g., linear resonant actuator [LRA], electroactive polymer [EAP] actuator, electromechanical polymer [EMP] actuator, etc.), a motor (e.g., brushless motor, brushed motor, direct current (DC) motor, alternating current (AC) motor, eccentric rotating mass (ERM), etc.), a piezoelectric device, and/or any other form of vibratory element. The set of actuators 112 preferably includes multiple actuators but can alternatively include a single actuator (e.g., a stationery actuator, a translatable actuator, etc.). In variations including multiple actuators, the actuators can be of the same type (e.g., all LRAs, all ERMs, etc.) or any combination of actuators (e.g., LRAs and ERMs). In a first variation of the actuation subsystem no, the set of actuators includes a set of multiple (e.g., 2, 4, 6, 8, 10, between 2 and 10, between 2 and 5, greater than 10, etc.) LRAs.

In actuation subsystems 110 including multiple actuators, the actuators can be arranged in an array (e.g., 1-dimensional array, 2-dimensional array, 3-dimensional array, etc.), arranged at least partially circumferentially around the body part (e.g., around a wrist, around half of the circumference of the wrist, etc.), arranged along the body part (e.g., up and down an arm), arranged over a body region (e.g., over the user's trunk, stomach, etc.), arranged among different body parts of a user (e.g., arranged around both wrists), and/or arranged in any other suitable way. The vibratory elements 120 can be directly coupled to the skin of a user, separated from a user by an element of the housing (e.g., the wristband), separated from the user by air and/or another gap, placed over a user's clothing, and/or coupled to the user in any other way. In variations of the system 100 configured to apply haptic stimulation to a wrist of the user, the system 100 preferably includes 4 LRA actuators arranged around a portion of the circumference (e.g., half the circumference) of the wrist. Additionally or alternatively, the system 100 can include actuators circumscribing the entire wrist (e.g., 8 LRA actuators), and/or any other suitable number and arrangement of actuators.

Any or all of the actuators can be configured to vibrate at any suitable frequency or frequencies, such as any or all of: a fixed frequency (e.g., a single frequency); a range of frequencies (e.g., which can be adjusted and/or programmed according to the prescribed stimulation pattern, adjusted based on the vibration frequencies associated with the other actuators, etc.); and/or any other suitable frequency or combination of frequencies.

In variations having multiple actuators (e.g., placed in a linear fashion along a wristband, arranged in an array on a vest, etc.), the system is preferably configured to reduce coupling between actuators (e.g., between adjacent actuators). This is preferably at least partially accomplished by using actuators having different vibration frequencies (e.g., different single vibration frequencies, different programmed vibration frequencies, etc.) from each other, which can function to reduce mechanical coupling between actuators. In a first set of specific examples, the actuation subsystem includes a set of multiple actuations, wherein each actuator (e.g., LRA) is associated with a different prescribed frequency, such as a single prescribed frequency. This can function to increase the ease in which a user can interpret the location (e.g., at an actuator, in-between actuators for haptic illusions, etc.) and/or source of a haptic stimulus; help a user interpret information and/or increase the amount of identifiable information being conveyed through haptic stimulation (e.g., associating particular phonemes with particular frequencies, adding another variable with which to distinguish haptic stimulation, etc.); increase the degree to which signals dampen between adjacent actuators; and/or perform any other suitable function(s). Additionally or alternatively, each actuator can be configured to vibrate at multiple frequencies, but be programmed to vibrate at different frequencies (e.g., when multiple actuators are being actuated simultaneously, when applying a stimulation pattern, at all times, etc.). Further additionally or alternatively, the actuators can be configured to vibrate at any suitable frequency or frequencies.

Each of the actuators is preferably configured to be actuated with a variety of different amplitude values (e.g., according to a prescribed stimulation pattern), which can function to adjust the intensity with which information is provided to the user. This can in turn function to differentiate between different audio information, such as, but not limited to any or all of the following ways: providing higher intensity stimulation for louder audio signals; providing different intensities of stimulation for adjacent actuators; increasing a range of different haptic stimuli able to be applied to the user (e.g., by adding in an adjustable amplitude parameter); enabling haptic stimuli to be distinguished from each other; enhancing the ability of the system to provide entertainment to the user (e.g., through control of intensities to represent and/or enhance a musical performance, to match the beat of a song at a concert, etc.); enable important audio to be easily detected (e.g., high amplitudes for sirens, smoke alarms, emergency vehicles, etc.); to enable the provision of tactile illusion stimulation (e.g., by actuating multiple actuators in rapid succession); and/or can perform any other suitable function(s).

Additionally or alternatively, each of the actuators can be any or all of: actuated with a single and/or constant amplitude (e.g., each actuator actuates with the same amplitude, the actuators vibrate with different but fixed amplitudes, etc.); an amplitude of stimulation is determined in response to controlling a frequency of vibration (e.g., according to the spec of the particular actuators); and/or the actuators can be otherwise stimulated in accordance with any other suitable parameters.

In a first set of variations, an amplitude of vibration of each haptic actuator is controllable and assigned based on an energy of the corresponding processed audio signal.

In a second set of variations, an amplitude of vibration of each haptic actuator is fixed and determined based on a fixed frequency value of the haptic actuator.

The set of actuators can additionally or alternatively be actuated in association with any suitable parameters having any suitable values such as, but not limited to, any or all of: speed, voltage, duration of stimulation, timing of stimulation, represented information associated with the actuator (e.g., particular phoneme, particular frequency range of audio signals, particular intensity range of audio signals, etc.), location of stimulation (e.g., in accordance with a tactile illusion), and/or any other suitable parameters.

The actuation subsystem preferably includes an actuator protection subsystem, which functions to protect the set of actuators during a manufacturing process and/or during use of the system. The actuator protection subsystem can protect the actuators from any or all of: fluid (e.g., injection molding material, air, etc.) ingress during an injection molding process; collapse of the actuators (e.g., due to air ingress during a heating and/or relatively high temperature process followed by an exit [e.g., rapid exit] of air during a cooling and/or relatively low temperature process); expansion of the actuators (e.g., due to air leakage during a cooling and/or relatively low temperature process followed by an ingress [e.g., rapid ingress] of air during a heating and/or relatively high temperature process); flexing of the actuators (e.g., while being curved around a wrist of the user); compression of the actuators (e.g., from the support subsystem); thermal effects on the actuators (e.g., from temperature changes in an environment of the user, from heating during use, etc.); fluid effects on the actuators (e.g., to seal off from fluid ingress);

insulation and/or isolation from other components (e.g., electrical insulation, mechanical isolation, etc.); conductivity (e.g., electrical conductivity); and/or any other suitable effects. Additionally or alternatively, the set of coverings can function to localize haptic stimulation to the location of the actuator (e.g., by damping the stimulation); eliminate and/or minimize audio produced by the actuators; and/or perform any other suitable function(s).

The actuator protection subsystem preferably includes a set of one or more coverings configured to at least partially cover each of the set of actuators. Coverage of the set of actuators can have several functions. First, several types of LRAs as well as other types of actuators are conventionally manufactured with a set of holes, which can cause complications when integrating the actuators with other components of the system. First, the holes can permit ingress of materials (e.g., liquid silicone) during an integration of the actuators with a surrounding component (e.g., wristband) of the system (e.g., during a molding process, during an overmolding process, etc.). Furthermore, heating and cooling the actuators during manufacture can cause deformation to them (e.g., air entering and exiting the actuators through the holes causes them to crush). In specific examples involving injection molding processes (e.g., multiple injection molding processes), for instance, the heating and then rapid cooling of components can cause a rapid exchange of air in and out of actuators with holes, causing the actuators to be crushed as air rapidly exits. By covering these holes with a set of coverings, no or minimal air exchange can occur, thereby enabling the actuators to maintain a structural integrity.

In preferred variations, the covering includes a set of caps (e.g., as shown in FIGS. 4A-4C), which are adhered together and/or to the actuator, wherein the caps cover the set of holes as well as provide a mechanical stability to the set of actuators. The caps are preferably made of a metallic material (e.g., steel, stainless steel, aluminum, chrome, brass, silver, gold, etc.), such as a stamped metal. The metallic material can function to provide a rigidity to the actuators; prevent rust; establish a conductive connection with other components; and/or perform any other function(s). Additionally or alternatively, the caps can be constructed in part or in full with any suitable material(s) such as, but not limited to, any or all of: a polymer (e.g., plastic, silicone, etc.); fabric; wood; rubber; organic materials; inorganic materials; and/or any other suitable materials.

In specific examples, a first cap (e.g., stamped steel) is secured (e.g., through press fitting, through adhesion, etc.) to the top (superior broad surface) of each actuator and a second cap is secured to the bottom (inferior broad surface) of each actuator.

Additionally or alternatively, the set of coverings can be any or all of: wrapped around any or all of the actuators; cover the actuators; cover the sides of the actuators; and/or otherwise cover or interact with the actuators. In some variations, for instance, the set of coverings includes a fabric wrapped around the actuators, which functions to damp the haptic stimulus provided by the actuator.

Further additionally or alternatively, the actuator protection subsystem can include any other suitable materials arranged in any form and in any suitable locations (e.g., on and/or coupled to actuator, separately from the actuators, etc.).

The information provided to the user through the set of actuators 112 is preferably in the form of a set of stimulation patterns (e.g., series of stimulation patterns), wherein the stimulation patterns prescribe any or all of the following to the set of actuators (e.g., individually, collectively, etc.): amplitude of vibration, timing of vibration (e.g., when to start, duration, when to end, etc.), sequence of vibration, identification of which of the set of actuators to vibrate, frequency of vibration, and/or any other parameter(s) of stimulation. In preferred variations, the stimulation pattern prescribes an amplitude of vibration and a duration of vibration to one or more actuators of the set of actuators, wherein each of the set of actuators is configured to vibrate at a fixed frequency. Additionally or alternatively, the stimulation pattern can prescribe a frequency of vibration, a dynamic pattern of vibration (e.g., alternating between actuators), and/or any other suitable characteristic or parameter(s) of vibration.

The stimulation patterns are preferably determined and/or prescribed based on a set of audio inputs, such as any or all of the audio information described above and/or below, wherein the stimulation patterns are determined (e.g., selected from a predetermined list, dynamically determined, determined in substantially real time, etc.) based on audio information such as any or all of: audio received at the haptic stimulation device, audio received at a user device, audio stored at a remote computing system, audio stored onboard the device, and/or any other suitable audio. In variations with audio inputs, the haptic stimulation pattern(s) can function to replace the audio information (e.g., for hearing impaired individuals, for individuals in distracting environments, etc.); enhance the audio information (e.g., to ensure that emergency sounds are heard, to enhance the user experience in an entertainment application such as a concert, etc.); create, prioritize, and/or otherwise alter audio information (e.g., haptic stimulation only provided based on desired and/or preferred sounds, etc.); and/or otherwise be used or implemented.

The stimulation pattern(s) associated with audio information can to convey any or all of: speech (e.g., such that the user can engage in conversation), music (e.g., composition of the music, "feel" of the music, etc.), environmental sounds (e.g., nature sounds, crosswalk indicator sounds, alarm clock, phone ring, phone notification, vehicle driving, etc.), safety sounds and/or alarms (e.g., smoke alarm, siren, vehicle horn, etc.), and/or any other suitable sounds.

The user of the device can be any or all of: a user with partial or full hearing loss (e.g., using the system to assist in conversation, safely interact with the environment, etc.), a user without hearing loss (e.g., to enhance a music experience, to supplement a musical concert with a haptic experience, to enhance a gaming experience, to provide redundant information in a supplemental form, etc.), a user with partial or full vision loss (e.g., to enhance auditory information, to provide a redundant source of information, to highlight important sound sources, etc.), or any other suitable user.

The stimulation pattern(s) can correspond to (e.g., represent) one or more phonetic (e.g., speech) components (e.g., one or more frequency locations of a formant, peak frequency amplitudes, phonemes, sub-phoneme components, super-phoneme assemblies, morphemes, phones, diphones, triphones, diphthongs, triphthongs, letter, word, phrase, etc.) as well as one or more features of phonetic components (e.g., phoneme pitch, phoneme energy, phoneme tone, phoneme emphasis, etc.). Additionally or alternatively, the stimulation pattern(s) can correspond to a musical parameter (e.g., a musical note, chord, instrument, rhythm, beat, cadence, etc.), and/or any other suitable audio parameter (e.g., frequency of a siren, volume, etc.).

Additionally or alternatively, any or all of the stimulation patterns can be determined based on and/or correspond to other information, such as, but not limited to, any or all of: visual information, location information (e.g., of the user with respect to an object, of the user with respect to an audio source, positional coordinates of the user, position of the user relative to a destination, etc.), information from one or more sensors (e.g., onboard the system, onboard a user device, etc.), motion information (e.g., of the system and/or user, of an object, position, velocity/speed, acceleration, information from an accelerometer, information from a gyroscope, orientation, etc.), user information (e.g., user preferences), any or all of the information described above and/or below, and/or any other suitable information. Further additionally or alternatively, any or all of the stimulation patterns can be predetermined (e.g., and selected from based on information); dynamically determined (e.g., as information is received, in real-time and/or substantially real-time, contemporaneously with received information, etc.); any combination; and/or otherwise determined.

The actuation subsystem preferably includes a haptic driver (e.g., LRA driver) configured to actuate the set of actuators according to the stimulation pattern. Additionally or alternatively, the actuators can be actuated in any suitable way with any other suitable component(s).

In a first variation, the actuation subsystem 110 includes a set of multiple tactile actuators configured to apply haptic stimulation (e.g., with a LRA driver) to a partial circumference of a wrist region of a user. Each of the multiple tactile actuators preferably includes a protective covering, which functions to protect the actuators during one or more manufacturing processes, such as one or more injection molding processes, and optionally to increase damping of the haptic stimulation to prevent coupling of stimulation between adjacent actuators and/or protect the actuators during use.

In a set of specific examples, the actuation subsystem includes 4 LRA actuators arranged around a partial circumference of the user's wrist in a wristband device, wherein the LRA actuators actuate in accordance with a set of haptic stimulation patterns and with an LRA driver.

In a second variation, the actuation subsystem includes a set of multiple tactile actuators configured to apply haptic stimulation to a body region of the user, wherein each of the tactile actuators is covered in a fabric covering configured to damp haptic vibration within the device (e.g., within the device itself as opposed to between the actuator and the user).

In a third variation, the actuation subsystem includes a set of multiple tactile actuators configured to apply haptic stimulation to a body region of the user, wherein each of the tactile actuators is coated (e.g., dip coated, spray coated, etc.) in a silicone covering configured to do any or all of: damp haptic vibration within the device (e.g., within the device itself as opposed to between the actuator and the user); reduce/damp acoustic outputs produced by the actuators; protect the actuators (e.g., during manufacturing; help place the actuators during manufacturing (e.g., cured to a first injection molding part prior to the next injection molding process); and/or perform any other function(s). Additionally or alternatively, any other materials for the coverings can confer these functions.

Additionally or alternatively, any other suitable actuators can be used with any suitable protective features and/or in absence of any protective features.

3.2 System: Support Subsystem 120

The system 100 includes a support subsystem 120, which functions to support the set of actuators. The support subsystem 120 can additionally or alternatively function to: suspend the set of actuators, maintain a separation distance between the set of actuators, maintain an offset (e.g., minimize, maintain a constant offset, etc.) of the set of actuators from a skin surface of the user, conform to a variety of users (e.g., conform to a variety of user wrist sizes, flex to wrap around a user's wrist, etc.), be comfortable to a user, enhance a vibration of the actuators (e.g., minimize a damping of the haptic output toward the user), reduce a coupling between adjacent haptic actuators (e.g., maximize a damping of vibrations within the device and/or within the space between adjacent actuators), reduce direct sound transmission from the set of actuators to a microphone, form the form factor of the device (e.g., wristband, vest, etc.), and/or perform any other suitable function(s).

The support subsystem 120 is preferably constructed from one or more substantially flexible materials (e.g., spring constant no greater than 200 N/m, no greater than 100 N/m, no greater than 50 N/m, no greater than 30 N/m, between 20 and 80 N/m, etc.) and/or one or more substantially compliant materials (e.g., elastic modulus no greater than 3 GPa, no greater than 2 GPa, no greater than 1 GPa, no greater than 100 MPa, between 20 and 50 MPa, durometer on the Shore A scale, durometer on the Shore 00 scale, etc.), which can function to conform to a user, translate a maximum vibration to a user, restore one or more vibratory elements to an initial configuration, reduce coupling between adjacent actuators, and/or perform any other suitable function. Additionally or alternatively, the support subsystem 120 can be constructed from one or more substantially rigid materials (e.g., elastic modulus greater than 3 GPa, elastic modulus greater than 10 GPa) and/or durable materials (e.g., protective coating, water resistant properties, etc.), which can function to withstand repeated vibrations, withstand friction from contact with a user, prevent fluid ingress, establish robust physical connections between components, and/or perform any other suitable function.

The support subsystem can be constructed from any or all of: a polymer (e.g., elastomer, silicone, rubber, liquid silicone rubber [LSR], plastic, etc.), foam, fabric (e.g., cotton, elastic, felt, etc.), metal, carbon fiber, wood, and/or any other suitable material(s). The support subsystem can further include one or more damping materials (e.g., foam, fabric, felt, cushion, etc.), which can function to terminate a vibration, isolate a set of vibrations from each other, and/or perform any other suitable function. In some variations, the support subsystem is constructed from LSR having a durometer less than 100 A. In a specific example, the LSR is LSR8660 having a durometer of 60 A.

In some variations, the support subsystem is constructed with a curvature (e.g., manufactured with one or more curved surfaces), which can function to contour/conform to a user (e.g., the radius of a user's wrist). In this and/or other variations, the support subsystem can have a high enough compliance such that the support subsystem naturally conforms to another component of the system and/or body part of a user (e.g., fabric wrapped around a torso of a user).

Additionally or alternatively, the support subsystem can be constructed to mimic and/or contour a particular anatomy of the body region (e.g., user-specific body region, based on an aggregated set of users, etc.); adapt to a variety of users; be adjustable in size and/or shape; and/or be otherwise configured.

The support subsystem can optionally include any number of support features, which can individually and/or collectively function to physically retain, support, separate, and/or isolate one or more actuators, provide structural integrity to the system 100 (e.g., prevent collapse), conform to a user, maintain a proper position and/or orientation on the user, and/or perform any other suitable function. The support features can be proud or recessed, and can include any or all of: separators (e.g., walls), cavities, notches, grooves, apertures, protrusions, channels, tabs, and/or any other suitable feature. The support features can be defined by, arranged on, arranged within, adhered to and/or otherwise configured relative to any surface(s) of the support piece, such as an internal surface, an external surface, a broad surface, an edge surface, and/or any other region of the support piece. The support features are preferably arranged proximal to one or more vibratory elements (e.g., underneath, adjacent to, surrounding, on top of, etc.), but can additionally or alternatively be arranged anywhere else in the housing. Additionally or alternatively, an electronics subsystem (e.g., as described below) can perform any or all of the support feature functions.

The set of support features are preferably directly formed into the support subsystem during one or more manufacturing processes (e.g., during a molding process such as an injection molding process, during an overmolding process, during multiple injection molding processes, etc.), but can additionally or alternatively be formed from any additive processes (e.g., casting process, silicone casting, etc.), any subtractive processes (e.g., milling, CNC, etc.), sewing (e.g., with fabric), weaving/knitting, and/or formed through any suitable processes or combination of processes.

The support subsystem and/or set of support features can optionally be configured to reduce mechanical coupling between actuators, such as through the use of a material which prevents (e.g., through damping, through the formation of dividers between adjacent actuators, etc.) the propagation of an actuator vibration to an adjacent actuator. A silicone support subsystem having individual partial or full cavities configured to receive each actuator can function to minimize coupling. Additionally or alternatively, the actuators can be otherwise arranged, configured, and/or a support subsystem can be otherwise configured (e.g., include fabric materials for damping, enclose the actuators, etc.).

Figure 3A:
FIGS. 3A-3D depict a variation of the system 100.
Figure 3B:
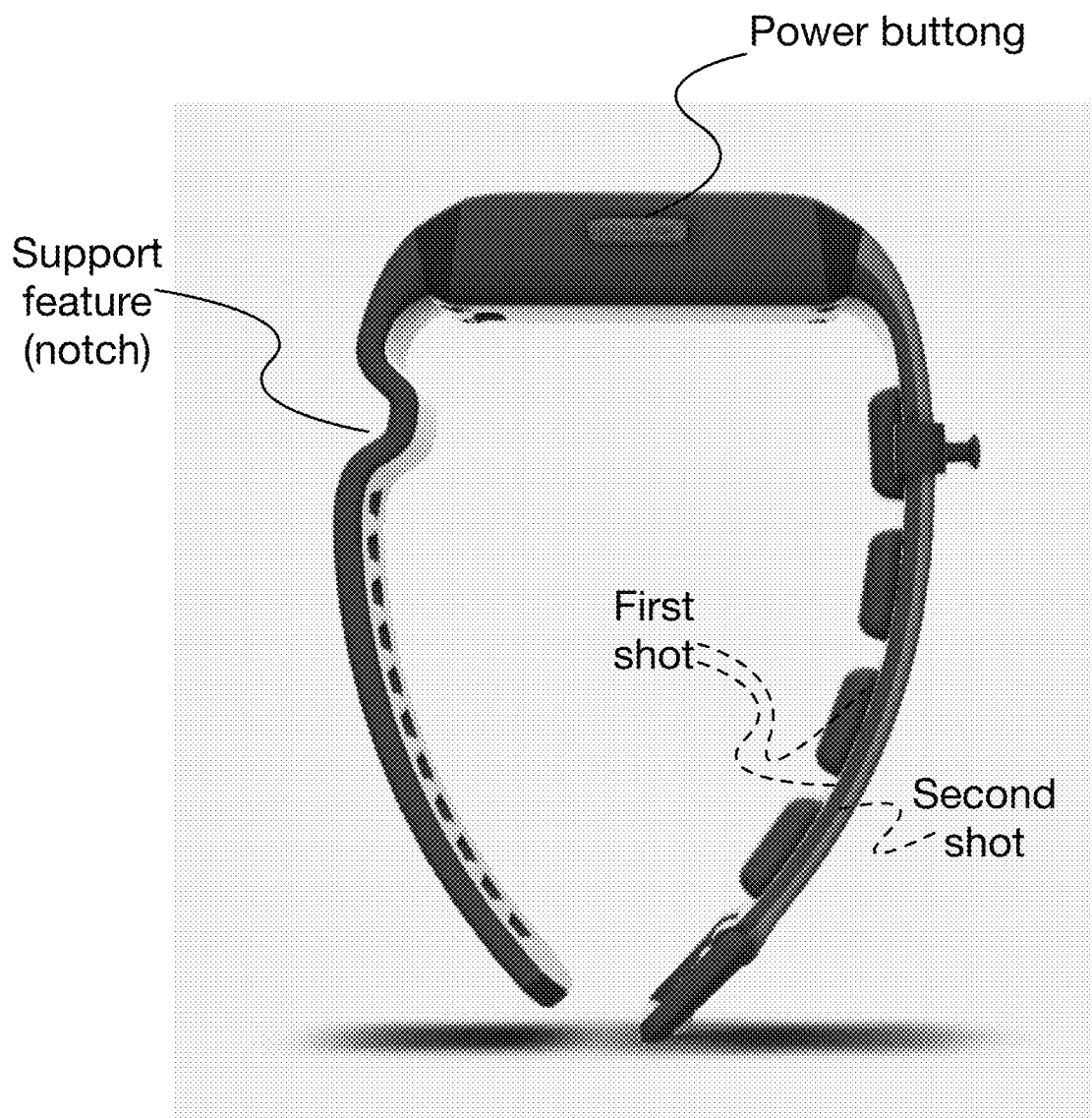
Figure 3C:
Figure 3D:

In a first variation, the support subsystem 120 includes a flexible LSR wristband configured to suspend the set of actuators around at least a partial circumference of the user's wrist. The support subsystem defines a set of support features including a set of protrusions arranged on an interior surface of the support subsystem, the set of protrusions formed during a molding process of the support subsystem, wherein each of the set of actuators is placed within a protrusion. The support features can additionally or alternatively include a curved section (e.g., notch shown in FIG. 3B) configured to maintain a placement of the system 100 on the wrist of a user (e.g., prevent system from rotating).

3.3 System: Rigid Housing 130

The system 100 preferably includes a rigid housing 130, which functions to support and/or protect any or all of the system 100. Additionally or alternatively, the rigid housing 130 can function to maintain an orientation of the system 100 on a user (e.g., prevent rotation of the support subsystem on the wrist of a user), assist in alignment of the support subsystem, optimize a configuration of a microphone assembly, protect the user and/or system from electrostatic discharge (ESD), and/or perform any other suitable function(s).

The rigid housing 130 defines one or more cavities (equivalently referred to herein as voids and/or interiors), which can individually and/or collectively enclose any or all of (e.g., as described below): a sensor subsystem 140, a control module 150, and an electronics subsystem 160. Additionally, the rigid housing 130 can optionally enclose any or all of the actuation subsystem, support subsystem, and/or any other suitable component(s) of the system.

The rigid housing 130 is preferably connected to (e.g., removably connected to, permanently connected to, manufactured with, adhered to, connected in a modular fashion, etc.) the support subsystem. Additionally or alternatively, the rigid housing can be arranged within a portion of the support subsystem or otherwise arranged.

The rigid housing 130 is further preferably connected to the support subsystem with a strain relief component and/or mechanism, which functions to prevent strain (e.g., stretching, pulling, etc.) on electrical connections between the rigid housing and the support subsystem. In some variations, for instance, a strain relief functions to attach electronic components (e.g., PCB, processing system, power source, etc.) within the rigid housing to a flexible PCB arranged within the length of the support subsystem. The strain relief can optionally include one or more components (e.g., elastic, connectors with nonzero slack, flexible connector, etc.) which function to prevent pulling between electrical components. Additionally or alternatively, the way in which the rigid housing is connected to the support subsystem can function as the strain relief. In specific examples, for instance, the support subsystem (e.g., with a rigid component formed at the ends) is attached to the rigid housing with a screw running perpendicular to the length of the flexible PCB (e.g., along the direction indicated in FIG. 7).

The rigid housing 130 preferably includes a rigid polymer material (e.g., Polycarbonate/Acrylonitrile Butadiene Styrene alloy [PC-ABS], polycarbonate, ABS, etc.), but can additionally or alternatively include a flexible polymer material (e.g., as described above for the support subsystem), metal, wood, glass (e.g., as part of a display), any material of the support subsystem, and/or any other suitable material (s). The rigid housing 130 is preferably designed to have a material (e.g., main material) configured to minimize and/or eliminate a propagation of sound originating from the vibration of the set of actuators to a microphone (e.g., as described below) within the housing. As such, one or more materials of the rigid housing can be selected to enable any or all of: sound reflection at an interface of the rigid housing and the support subsystem, attenuation of a sound wave, alteration of a frequency of a sound wave (e.g., such that the microphone removes it through filtering), and/or enable any other outcome. In some variations, for instance, the rigid housing has a larger stiffness (e.g., significantly larger stiffness, stiffness at least twice as stiff, stiffness at least an order of magnitude stiffer, etc.) than a stiffness of the support subsystem. In specific examples, the rigid housing is partially or fully made from PC-ABS with a Shore A hardness.

The rigid housing can be fully sealed from the environment, partially sealed from the environment (e.g., sealed from a skin surface of the user, sealed aside from an aperture proximal a microphone, etc.), open to the environment, and/or any combination of sealed and open to environment.

The rigid housing preferably defines a set of one or more apertures, which function to let in sound to be sampled at a microphone of a microphone assembly (e.g., as described below). In preferred variations, an aperture is defined at a superior surface of the rigid housing superior to each microphone of the microphone assembly, which enables sound to be sampled at the microphone from the environment. Additionally or alternatively, the rigid housing can include apertures at any suitable locations; include no apertures; and/or be otherwise configured.

In variations of the system 100 configured to be coupled to a wrist of the user, the rigid housing 130 is preferably arranged with the rigid housing arranged on a broad exterior surface of the wrist (opposing the wrist region adjacent the user's palm). Additionally or alternatively, the rigid housing can be arranged on any broad surface and/or any other suitable surface.

In a first variation, the rigid housing is made from a polymer (e.g., PC-ABS) and defines a cavity which houses at least an electronics subsystem and a microphone assembly, wherein a superior surface of the rigid housing includes an aperture arranged superior to a microphone. The rigid housing is preferably connected to a relatively flexible (e.g., more flexible than the rigid housing) support subsystem with an attachment which provides strain relief to the connection between electrical components in the rigid housing and those in the support subsystem.

3.4 System: Sensor Subsystem 140

The system 100 includes a sensor subsystem 140, which functions to receive information with which to produce a haptic stimulation pattern. Additionally or alternatively, the sensor subsystem 140 can include one or more sensors to sample supplementary data associated with the environment (e.g., humidity, temperature, etc.), supplementary data associated with the user (e.g., user vitals), and/or any other suitable information.

The sensor subsystem 140 within and/or on any or all of the following: the rigid housing (e.g., within a cavity/chamber of the rigid housing, on a surface of the rigid housing, partially exposed through an aperture of the rigid housing, etc.), the support subsystem (e.g., within a lumen of the support subsystem, attached to an exterior surface, attached to an interior surface, etc.), remote from the system 100 (e.g., part of a user device communicatively coupled to the system 100), and/or otherwise arranged.

The sensor subsystem 140 preferably includes a microphone assembly including a set of one or more microphones, which individually and/or collectively sample audio information from an environment of the user, which can be subsequently analyzed (e.g., processed, assessed, etc.) to determine (e.g., create, select, etc.) a stimulation pattern to be applied at the set of actuators. The microphone assembly is preferably fully arranged within the rigid housing, but can additionally or alternatively be arranged partially or fully outside of the rigid housing. The set of microphones are preferably micro-electromechanical system (MEMS) microphones, and can include any or all of: one or more omnidirectional microphones, one or more unidirectional microphones, one or more bidirectional microphones, and/or any other suitable microphones (e.g., non-MEMS).

Figure 6:
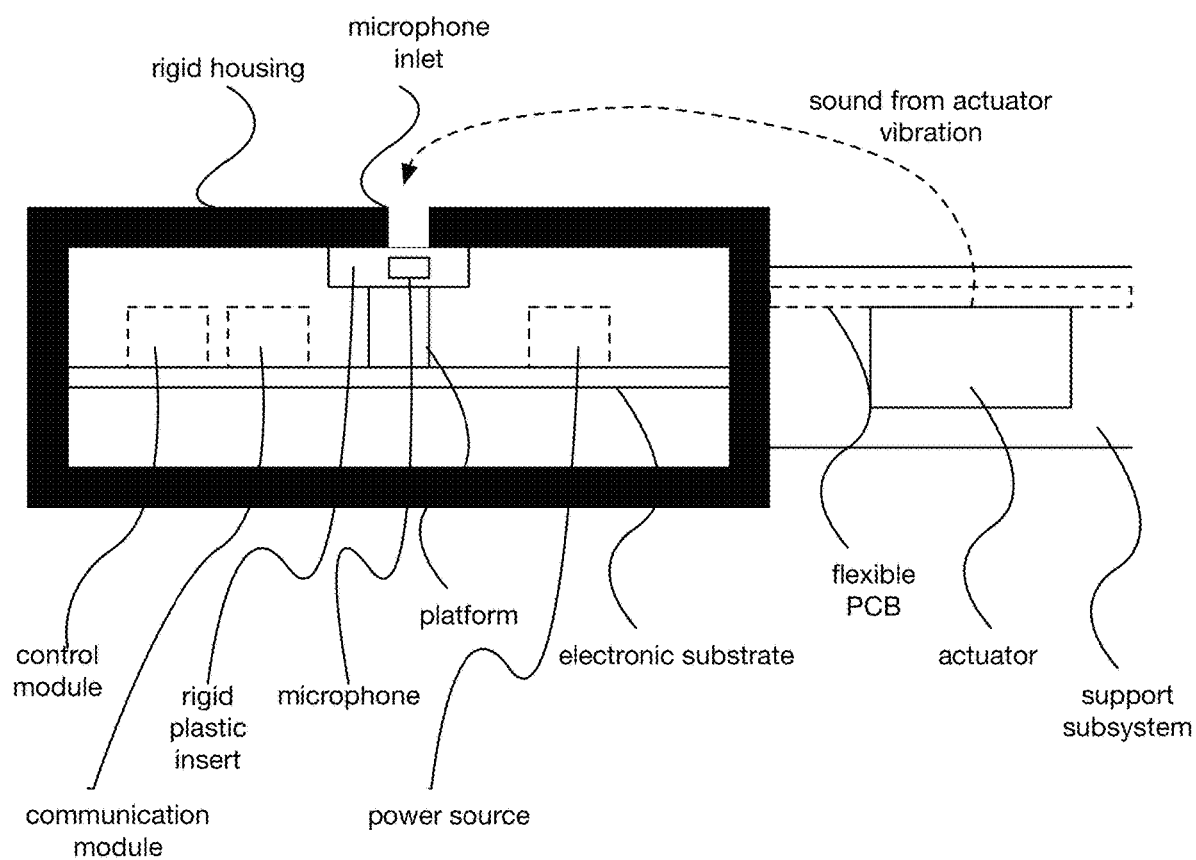
FIG. 6 depicts a schematic representation of a variation of microphone placement in a rigid housing.

At least one microphone of the set of microphones is preferably arranged at an approximately central region of the rigid housing (e.g., along a central axis, at the intersection of two central axes, at the center of a plane defined by a broad surface of the rigid outer housing, along an axis bisecting the rigid outer housing, offset from a side wall of the rigid housing, as shown in FIG. 6, etc.), which functions to minimize sound from the actuators received at the microphone (e.g., by not directly mechanically coupling the microphone to the support subsystem). Additionally or alternatively, any or all of the set of microphones can be otherwise arranged.

In variations of the sensor subsystem 140 having multiple microphones, the microphones can optionally additionally or alternatively be arranged in a configuration configured to locate a sound source (e.g., through triangulation).

To enable this placement and/or confer any other functions, the microphone assembly preferably includes a platform (e.g., as shown in FIG. 6) for the microphone. The platform is preferably connected to a PCB of the electronics subsystem (e.g., as described below), wherein the platform is configured to raise the microphone to a top surface of the rigid housing. The rigid housing can optionally include one or more inserts (e.g., hard plastic insert, damping material, etc.) configured to reduce incoming feedback from noise (e.g., motor noise) of the set of vibratory elements. This can function, for instance, to prevent noise which may enter the rigid housing from the vibratory elements from reaching the microphone. Additionally or alternatively, the microphone can be otherwise supported.

The microphone can optionally include an acoustic mesh arranged between the microphone and the aperture defined by the rigid housing (superior to the microphone), which functions to protect the microphone from materials (e.g., liquids, particles, etc.) which could enter through the aperture. Additionally or alternatively, the acoustic mesh can be otherwise arranged and/or the microphone assembly can include any other suitable components (e.g., sealing components).

The microphone assembly can optionally further include a conductive material and/or component/layer (e.g., metallic layer/plate) arranged between the acoustic mesh and the microphone and/or integrated within the acoustic mesh, which functions to provide ESD protection and prevent a threshold amount of static electricity from being reached and/or exceeded. The microphone assembly further preferably includes a grounding clip which connects the conductive layer to a PCB of the electrical subsystem. Additionally or alternatively, the microphone assembly can include any other suitable components arranged in any suitable way.

The microphone assembly can optionally include an enclosure surrounding the microphone (e.g., within the rigid housing), which functions to prevent sound from within the device, such as sound generated by the actuation subsystem, from reaching the microphone, which ensures that the appropriate audio is being processed and provided to the user. The enclosure is preferably in contact with a superior internal surface of the rigid housing and a base (e.g., PCB) of the microphone and surrounding the microphone, but can be otherwise suitably arranged. In some variations, the enclosure includes a set of plastic walls arranged around the microphone within the rigid housing.

In a first variation, the sensor subsystem 140 includes a microphone (e.g., an omnidirectional microphone) arranged at a superior surface of the rigid housing, wherein the rigid housing includes a rigid plastic insert configured to at least partially surround the microphone and isolate it from the remaining cavity of the rigid housing, thereby preventing noise from the vibratory elements which reaches the cavity from reaching the microphone.

Figure 8:
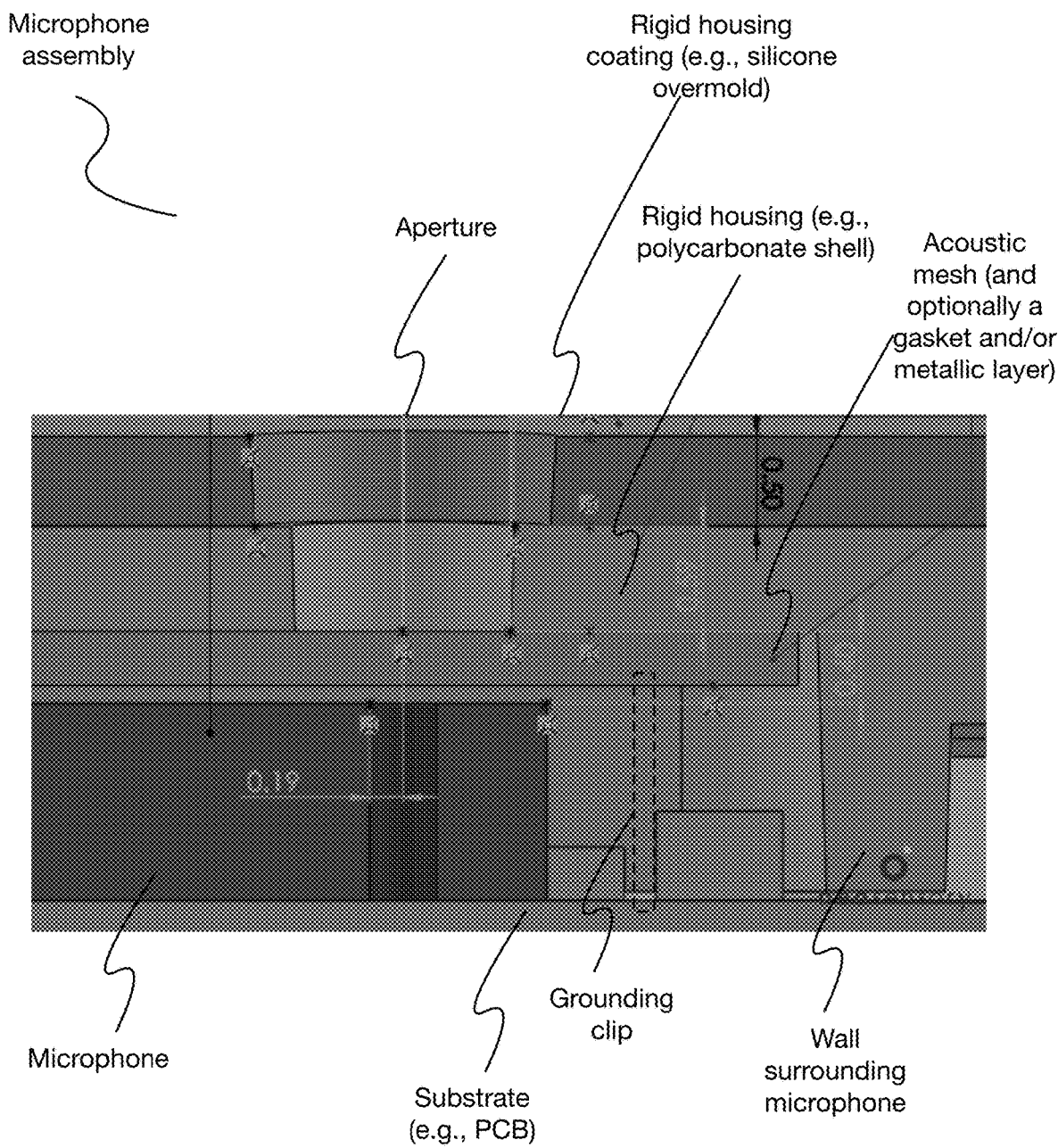
FIG. 8 depicts a variation of a cross section of the rigid housing demonstrating a microphone assembly.

In a specific example of the microphone assembly (e.g., as shown in FIG. 8), the microphone assembly includes a microphone inferior to an aperture defined in the rigid housing; a substrate (e.g., PCB) to which the microphone assembly is mounted; an acoustic mesh and/or gasket arranged between the microphone and the aperture; optionally a conductive material/component arranged within the acoustic mesh and/or inferior to the acoustic mesh (e.g., for ESD protection); optionally a grounding clip connecting the conductive material/component to the substrate; and a structure surrounding the microphone (e.g., defined by the rigid housing, within the rigid housing, etc.) to prevent acoustic information generated within the device (e.g., the actuation subsystem) from reaching the microphone.

The sensor subsystem can additionally or alternatively include any other sensors, such as any or all of: an optical sensor (e.g., camera), location sensor (e.g., GPS system), motion sensor (e.g., accelerometer, gyroscope, etc.), and/or any other suitable sensor(s).

Any or all of the sensor subsystem can be arranged onboard the device, onboard a user device, arranged remotely, and/or otherwise arranged.

3.5 System: Control Module 150

The system 100 includes a control module 150, which functions to apply a tactile stimulation pattern (equivalently referred to herein as a stimulation pattern and/or a haptic stimulation pattern) through the actuation subsystem. Additionally or alternatively, the control module can function to determine one or more stimulation patterns (e.g., at a computing subsystem), store one or more stimulation patterns, monitor system performance, implement a fail-safe (e.g., power shut-off in the event of overheating or stimulation pattern parameter above a predetermined threshold, alarm, etc.), and/or perform any other suitable function.

The control module is preferably onboard the system 100 (e.g., as part of the electrical subsystem), further preferably arranged within the rigid housing 130, wherein the control module is electrically and/or mechanically connected to one or more actuators (e.g., through an electrical subsystem as described below). Additionally or alternatively, any or all of the control module can be remotely arranged (e.g., as part of a user device), wherein the system 100 is communicatively coupled (e.g., wirelessly coupled) to the remote control module. In some variations, an onboard control module is in communication with a remote control module onboard a user device (e.g., processor in a mobile phone), wherein the remote control module is communicatively coupled to the system 100 (e.g., to an onboard control module) through a communication module. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component. Intensive processing (e.g., processing requiring large amounts of storage, RAM, computing power, etc.) is preferably done remotely (e.g., to miniaturize a device worn by the user), but can additionally or alternatively be done onboard the system 100.

The control module 150 can optionally function to determine one or more stimulation patterns. Determining a stimulation pattern can include any or all of: determining a new stimulation pattern (e.g., based on an algorithm, based on a machine learning model, etc.), selecting a stimulation pattern (e.g., from a lookup table, from a library, from a record of previously applied stimulation patterns, etc.), determining a set of parameters associated with a stimulation pattern (e.g., a set of weights for a stimulation pattern algorithm, an amplitude a stimulation, a frequency of stimulation, etc.), and/or any other suitable stimulation pattern and/or parameter(s) associated with a stimulation pattern. In some variations, the control module 150 includes and/or is configured to interface with a computing subsystem (e.g., onboard computing subsystem, a computing subsystem associated with a user device, etc.), wherein the computing subsystem determines one or more stimulation patterns.

The control module preferably includes a processing subsystem including one or more of: controller(s) (e.g., a microcontroller, embedded controller, control circuit, etc.), processor(s) (e.g., a microprocessor, central processing unit [CPU], graphics processing unit [GPU], etc.), system on a chip (SoC) or other integrated circuit, timing subsystem including a set of timers, and/or stimulus generator (e.g., multi-channel stimulus generator, set of stimulation control instructions, etc.), but can additionally or alternatively include any other component(s) suitable for selecting, applying, monitoring, and/or regulating the application of a vibration stimulus pattern.

In preferred variations, the system includes a processing system, further preferably a CPU, onboard the device, which functions to process information received at the device (e.g., audio information received at a microphone assembly) in order to determine one or more stimulation patterns to be provided at the actuation subsystem. The onboard processing system can further include and/or be in communication with a remote processing system onboard a user device in communication with the onboard processing system. In specific examples, the remote processing system is used to specify an operation mode of the system (e.g., on/off mode, daytime mode, nighttime mode, music mode, conversation mode, entertainment mode, safety mode, etc.), wherein the operation mode specifies the types of audio information to be prioritized and/or translated into haptic stimulation (and optionally takes into account one or more user preferences and/or user inputs) and communicates the operation mode to the onboard processing subsystem, wherein the onboard processing subsystem processes audio information and determines haptic stimulation patterns based on the operation mode. Additionally or alternatively, the one or more processing systems can be otherwise configured.

The control module can include data storage (e.g., to store stimulation patterns), which can be onboard the system 100 (e.g., in the form of a memory chip, memory card, etc.) or external to the system 100 (e.g., via wireless communication with a remote server, the cloud, etc.). The control module can include (e.g., in data storage) and/or access (e.g., in remote data storage) one or more algorithms (e.g., machine learning algorithms), indexing schemes/mappings (e.g., indices of vibratory elements), and/or any other information.

Figure 9:
FIG. 9 depicts a variation of information exchange between a haptic stimulation device and a user device executing a client application.

In a first variation, the system 100 includes an onboard processing subsystem (e.g., CPU) arranged onboard the device in a rigid housing, wherein the onboard processing subsystem processes the information received at the device (e.g., from the microphone) according to any number of algorithms (e.g., algorithms which mimic the inner ear, separate sound into its component frequencies, cancel out unrelated/unimportant noise, transform a change in frequencies over time into a pattern of vibrations) and/or models (e.g., machine learning models, deep learning models, neural networks, decision trees, etc.) to determine the haptic stimulation (e.g., stimulation patterns) to be applied at the actuation subsystem. The onboard processing subsystem is optionally in communication with a client application executing on a user device (e.g., as described below), wherein an operation mode is determined and/or one or more user inputs are received at the client application (e.g., as shown in FIG. 9) and communicated to the onboard processing subsystem.

In a second variation, additional or alternative to the first, the client application and/or user device can perform any or all of the processing.

3.6 System: Electrical Subsystem 160

The system 100 includes an electrical subsystem 160 (equivalently referred to herein as an electronics subsystem), which includes and/or interfaces with any or all of: a power source, current source, control module, set of PCBs, and/or any other suitable electrical/electronic component(s) of the system.

The electrical subsystem functions to power the actuation subsystem, and can additionally or alternatively function to: power other components of the device, perform processing of information (e.g., to determine and apply a set of electrical stimulation patterns), electrically connect components of the system, enable communication to be established with one or more user devices and/or remote computing systems; and/or perform any other suitable functions.

The electrical subsystem 160 includes an electrical coupler 162 arranged within the support subsystem, wherein the electrical coupler is configured to electrically connect each of the set of actuators to a control module (e.g., as described below) and/or to a power source. Additionally the electrical coupler can electrically connect the set of actuators together and/or connect any other suitable components of the system together. In preferred variations, the electrical coupler is in the form of a flexible printed circuit board (PCB), wherein the flexible PCB (equivalently referred to herein as a flex PCB) connects to (e.g., forms a base for, connects to the undersides of, surrounds each of, etc.) the set of actuators and flexes with the support subsystem. The set of actuators can be any or all of: mounted to the flexible PCB, embedded within the PCB, integrated within the PCB, attached to/adhered to, coupled to with a set of wires, and/or otherwise connected to the flexible PCB.

In preferred variations, the flexible PCB (equivalently referred to herein as a flex PCB) includes a set of apertures, each of the set of apertures configured to receive an actuator. Additionally or alternatively, any or all of the actuators can be mounted to a broad surface of the flexible PCB. In a specific example, the flex PCB includes a set of apertures, wherein the set of actuators are configured to be placed in an alternating fashion into the set of apertures (e.g., as shown in the injection molded interior portion of FIG. 7), such that traces of the flex PCB can be arranged both above and below the set of actuators, thereby minimizing a width of the flex PCB (e.g., as opposed to having all the traces on the same side). Each of the set of apertures preferably has a diameter larger than a diameter of the actuator, such that there is a gap between the flex PCB and the actuator, which functions to prevent the actuator from vibrating against the flex PCB and propagating the vibration. The flex PCB further preferably includes a set of alignment apertures, which function to ensure proper alignment of the flex PCB during manufacturing (e.g., a second molding process).

Further additionally or alternatively, the electrical coupler can include a set of conductive wires configured to electrically connect components together, a non-flexible PCB (e.g., as part of a patch embodiment), and/or any other suitable electrical coupler.

The electrical subsystem includes an electronic substrate 164 configured to mechanically support and/or electrically connect any number of components of the system 100, such as any or all of: a control module (e.g., a microprocessor, a microcontroller, etc.), a sensor subsystem (e.g., the microphone), a microphone platform, a power module, a communication module, and/or any other suitable component(s). In preferred variations, for instance, a second PCB (e.g., a rigid PCB) is arranged within the rigid housing to electrically connect and optionally serve as a base/mounting platform for one or more electrical components housed within the rigid housing.

Figure 7:
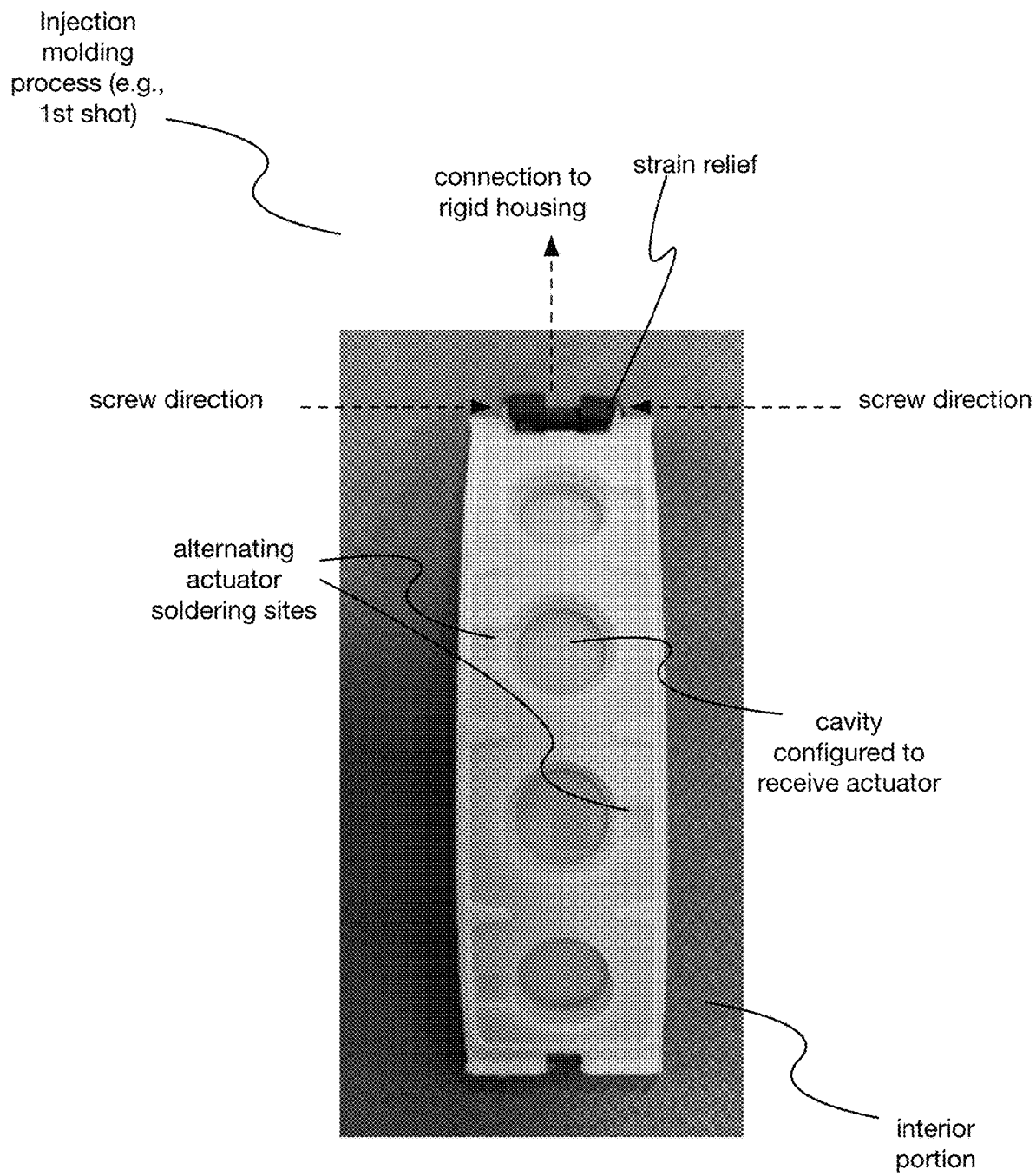
FIG. 7 depicts a variation of a result of a first injection molding process.

In some variations, the strain relief (e.g., as shown in FIG. 1, as shown in FIG. 7, as described above, additional or alternative to the strain relief described above, etc.), which functions to electrically and mechanically connect the electronic substrate to the electrical coupler. The strain relief can additionally function to minimize and/or prevent sound from propagating from the set of actuators to an interior of the rigid housing (e.g., by creating a change in stiffness from the electrical coupler to the electronic substrate). The strain relief can be arranged within the support subsystem, within the rigid housing, between the rigid housing and the support subsystem, and/or at any other part of the system 100. In preferred variations, the strain relief is made from the same material as the rigid housing and facilitates an electrical connection (e.g., through wires) between electrical component of the rigid housing and the flexible PCB of the support subsystem.

The electrical subsystem further preferably includes a power source configured to power any or all of the system 100. In some variations, the system 100 includes a battery (e.g., rechargeable battery) arranged in the rigid housing and/or the support subsystem and electrically connected to the set of actuators. The system can additionally include a charging port and/or any other suitable component(s).

In one variation, a set of one or more PCBs is arranged in a cavity of the rigid housing and configured to electrically and mechanically support any or all of: the control module, microphone (e.g., via a microphone platform), and/or any other components (e.g., optional components described below), wherein the PCB is electrically connected (e.g., via a strain relief as described below) to an electrical coupler arranged in the support subsystem.

3.7 System: Optional Components

The system 100 can optionally include any number of additional components, such as any or all of the components described below.

The system 100 can optionally include any number of inputs, such as buttons, switches, knobs, touch sensitive surfaces, and/or any other component(s) configured to receive an input from a user. In a preferred variation, the system 100 includes a power button, a first adjuster button (e.g., increase button), and second adjuster button (e.g., decrease button). In a specific example, the increase button (e.g., '+' button) increases a sensitivity of the audio processed by the system (e.g., lowers a loudness threshold required to sample, record, and/or otherwise use audio), and the decrease button (e.g., '-' button) decreases a sensitivity of the audio processed by the system, which can be used, for instance, to adjust how much noise is present in the audio.

The system 100 can optionally include any number of outputs, which can function to communication information to a user. In a preferred variation, the system 100 includes a set of indicator lights (e.g., LED lights), which can indicate any or all of: an on/off state of the system, a charge level of a battery, an operation mode, and/or any other suitable information.

The system 100 can optionally include and/or be configured to interface with a user device and/or a client application executing on the user device. The client application preferably enables a user to provide one or more inputs and/or select one or more operational parameters of the system 100, such as any or all of: an operation mode (e.g., music mode, conversation mode, quiet mode, on mode, off mode, etc.), an operational parameter (e.g., sensitivity of detected audio, overall amplitude of vibration, etc.), and/or any other suitable parameter. The user device can include any or all of the user device(s) described above.

The system 100 can further optionally include a communication module, wherein the communication module is configured to enable communication between the system 100 and a user device (e.g., as described above). The communication module can include a Bluetooth module, a Wifi module (e.g., Wifi chip), and/or any other suitable component configured for wireless communication.

Additionally or alternatively, the system 100 can include any other suitable component(s).

The system 100 can be operated in accordance with any or all of the processes and methods described in any or all of the following: U.S. patent application Ser. No. 14/750, 626, filed 25 Jun. 2105, U.S. patent application Ser. No. 15/452,207, filed 7 Mar. 2017, U.S. patent application Ser. No. 15/661,934, filed 27 Jul. 2017, U.S. patent application Ser. No. 15/696,997, filed 6 Sep. 2017, U.S. patent application Ser. No. 15/716,195, filed 26 Sep. 2017, U.S. patent application Ser. No. 15/795,054, filed 26 Oct. 2017, U.S. Provisional Application Ser. No. 62/487,832, filed 20 Apr. 2017, and U.S. Provisional Application Ser. No. 62/509,370, filed 22 May 2017, each of which is incorporated in its entirety by this reference.

Additionally or alternatively, the system 100 can be operated in accordance with any other suitable process(es) or method(s).

4. Method 200

The method 200 for manufacture functions to manufacture any or all of the system 100. Additionally, the method 200 can function to perform any or all of: minimizing and/or eliminating coupling between adjacent actuators (e.g., by overmolding the set of actuators with silicone), create a comfortable system for the user (e.g., by enabling a curved molding of the support subsystem), and/or perform any other suitable function.

Figure 5A:
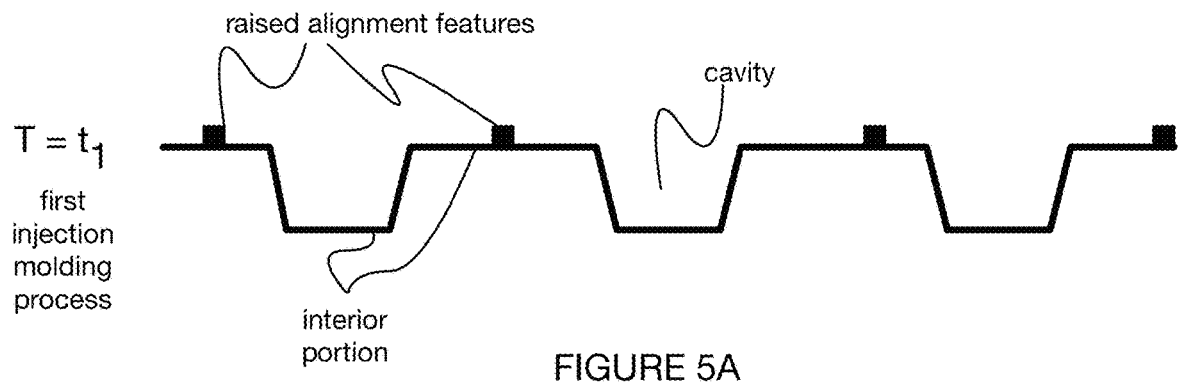
FIGS. 5A-5C depict a schematic representation of a variation of injection molding processes.
Figure 5B:
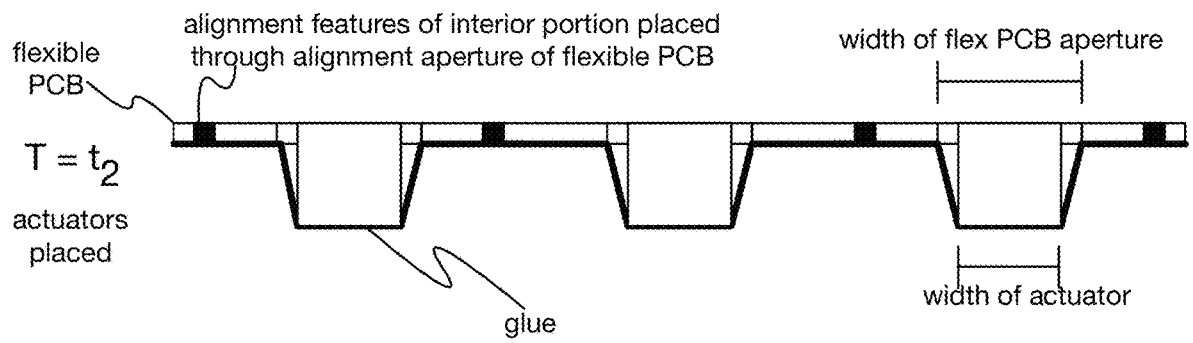
Figure 5C:
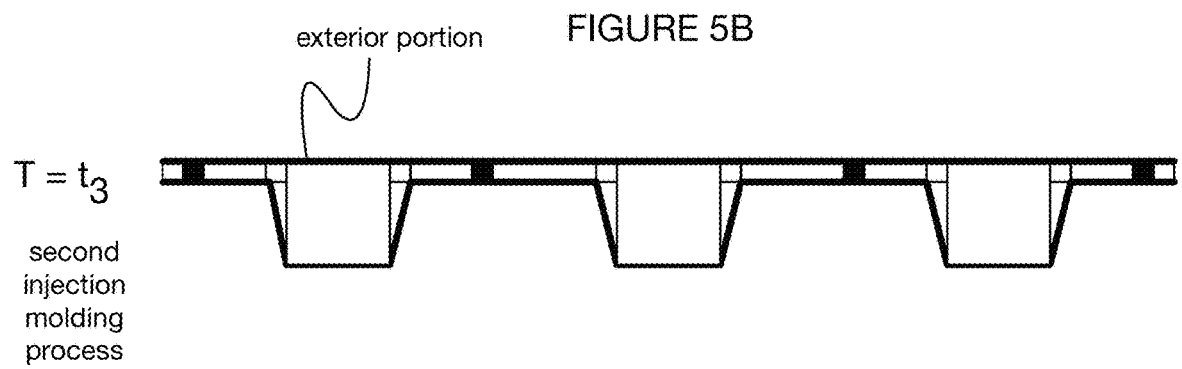

The method 200 preferably includes a set of injection molding processes (e.g., injection molding, overmolding, insert molding, as shown in FIGS. 5A-5C, etc.), wherein the injection molding processes are configured to form the support subsystem and properly integrate the set of actuators within the support subsystem (e.g., through overmolding). The set of injection molding processes can be configured for any or all of: forming a shape which mimics the anatomic region at which the system is applied (e.g., curved support subsystem to be worn on a user's wrist); maintaining proper placement and orientation of the set of actuators (e.g., choosing draft angle(s) which minimize or prevent the formation gaps of injection molding material adjacent to the set of actuators, prevent shifting of an electrical coupler during a second shot injection molding process, etc.); and/or be otherwise configured.

In preferred variations (e.g., as shown in FIG. 10), the injection molding processes include a first injection molding process (e.g., first shot of injection molding), wherein the first injection molding process includes forming an interior portion of the support subsystem, wherein the interior portion is configured to be arranged proximal to the user (e.g., against a user's wrist), wherein the first process forms a set of cavities configured to retain the set of actuators and a set of alignment features (e.g., raised pegs) configured to receive and maintain a position of an electrical coupler (e.g., PCB). The set of actuators are then placed in the cavities with the electrical coupler connected to (e.g., soldered to) and surrounding the set of actuators. The injection molding processes further include a second injection molding process (e.g., second shot of injection molding) configured to overmold the set of actuators and the electrical coupler, wherein the second shot forms an exterior portion (e.g., smooth exterior portion) of the support subsystem. In a specific example, the first and second shots form a curved support subsystem configured to be worn adjacent to a user's wrist.

The method 200 further preferably includes applying a set of caps to each of the set of actuators prior to the set of injection molding process(es) to prevent fluid ingress of the injection molding material (e.g., ingress of silicone, ingress of LSR, etc.) into a set of holes of each actuator and to prevent crushing of the actuator during heating and cooling processes of the method (e.g., during heating and cooling associated with injection molding). In preferred variations (e.g., as shown in FIGS. 4A-4C), a first metal (e.g., steel, stainless steel, etc.) cap is adhered to a top of each actuator and a second metal cap is adhered to a bottom of each actuator. Additionally or alternatively, the actuators can be uncovered, completely sealed, coated and/or dipped in a protective layer, and/or otherwise protected.

The method 200 can additionally include any or all of: adhering (e.g., gluing) the set of actuators to a portion of the support subsystem (e.g., after a first shot and prior to a second shot of injection molding); attaching the rigid housing to the support subsystem (e.g., after the injection molding process(es), prior to the injection molding process(es), in between multiple injection molding process(es), etc.); attaching a plastic strain relief to an electrical coupler and an electronic substrate (e.g., after multiple injection molding processes); and/or any other suitable process(es).

In preferred variations, the method 200 includes connecting with rigid housing and the support subsystem with a strain relief component and/or mechanism, such as any or all of those described above. In specific examples, for instance, a rigid component (e.g., as shown in the strain relief in FIG. 7) is attached to the rigid housing with a set of one or more screws in one or both of the screw directions indicated in FIG. 7. This functions to prevent strain in a perpendicular direction (see arrow in FIG. 7 pointing to rigid housing) on connections between electrical components in the support subsystem and the rigid housing. In specific examples, the strain relief component is made from a rigid material (e.g., same material as the rigid housing) and present in all injection molding processes. Alternatively, the component can be made of any suitable material and/or added after one or more injection molding processes.

5. Variations

In one variation of the system 100 (e.g., as shown in FIGS. 3A-3D), the system includes: an actuator subsystem (e.g., set of 4 LRA actuators, set of 8 LRA actuators, etc.) configured to apply haptic stimulation (e.g., according to a stimulation pattern), equivalently referred to herein as tactile stimulation and/or vibratory stimulation, with a haptic driver (e.g., LRA driver) to a portion of a wrist region of a user; a set of actuator coverings (e.g., set of caps) adhered to each actuator, wherein the caps cover the set of holes as well as enable a mechanical stability of the set of actuators; a flexible support subsystem (e.g., LSR wristband) configured to suspend the set of actuators around at least a partial circumference of the user's wrist, wherein the support subsystem defines a set of support features including a set of protrusions arranged on an interior surface of the support subsystem, the set of protrusions formed during a molding process of the support subsystem, wherein each of the set of actuators is placed within a protrusion, and a curved notch configured to maintain a placement of the system 100 on the wrist of a user; a rigid housing arranged on a broad exterior surface of the wrist (opposing the wrist region adjacent the user's palm) and defining a cavity, wherein the cavity includes a microphone and a control module (e.g., configured to apply stimulation patterns to the haptic driver); and an electronics subsystem including an electronic substrate arranged in the rigid housing and an electrical coupler configured to electrically connect each of the set of actuators to the electronic substrate (e.g., and to the haptic driver). Additionally, the system 100 can include any or all of: an application executing on a user device, wherein the client application can receive inputs and/or determine an operation mode for the device (and/or process an audio dataset to determine a stimulation pattern); a communication module configured to establish communication between the wristband and the user device; a power source; a set of inputs, such as buttons, switches, knobs, touch sensitive surfaces, and/or any other component(s) configured to receive an input from a user; a set of outputs (e.g., indicator lights); and/or any other suitable component(s).

In one variation of the method 200 for manufacture (e.g., as shown in FIG. 2), the method includes any or all of the following, performed in any suitable order: adhering a set of coverings to each of a set of actuators; soldering each of the set of actuators in an alternating fashion to a flexible PCB; performing a first injection molding process with a silicone material (e.g., LSR) to form an interior portion of a wristband, wherein the interior portion defines a set of cavities configured to receive each of the set of actuators and set of protrusions configured to receive the flexible PCB; placing the actuators and the flexible PCB on the interior portion, wherein the actuators are placed in the set of cavities and the flexible PCB is aligned and secured (e.g., by aligning a set of apertures in the flexible PCB over the set of protrusions) so that the flexible PCB does not move during a subsequent injection molding process; performing a second injection molding process to overmold the set of actuators and the flexible PCB, and to form an exterior portion of the wristband; connecting the flexible PCB to a PCB board of the rigid housing via a strain relief; and connecting the rigid housing to the support subsystem. Additionally, the method 200 can include any other suitable process(es).

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

What is claimed is:

1. A system for applying tactile stimulation to a wrist region of a user in a coupled configuration, the system comprising:
a wrist assembly that encircles the wrist region in the coupled configuration, the wrist assembly comprising:
a first housing comprising a polymeric material having a first hardness, wherein the first housing defines an aperture arranged at a superior broad surface of the first housing;
a second housing comprising a polymeric material having a second hardness, wherein the second housing defines a notched region that prevents rotation of the first housing relative to the wrist region in the coupled configuration, and wherein the second housing is formed through a set of multiple injection molding processes;
an actuation subsystem arranged within the second housing, the actuation subsystem comprising:
a set of multiple actuators that are arranged around a partial circumference of the wrist region in the coupled configuration; and
a set of actuator coverings coupled to each of the set of multiple actuators;
an electronics subsystem arranged within the first housing, the electronics subsystem comprising:
a microphone assembly, wherein the microphone assembly comprises:
an omnidirectional microphone arranged inferior to the aperture;
an acoustic mesh arranged superior to the omnidirectional microphone;
a conductive material arranged superior to the omnidirectional microphone;
wherein the first housing defines a set of walls surrounding the microphone; and
a processor that processes a set of audio signals sampled at the omnidirectional microphone to produce a stimulation pattern produced at the set of haptic actuators.

2. The system of claim 1, wherein the first hardness is greater than the second hardness.

3. The system of claim 1, wherein the set of actuator coverings comprises a pair of caps, a first cap secured to a superior broad surface of the actuator and a second cap secured to an inferior broad surface of the actuator.

4. The system of claim 3, wherein each of the first cap and the second cap is a steel cap.

5. The system of claim 4, wherein the first and second caps prevent collapse of the actuator during the set of multiple injection molding processes.

6. The system of claim 1, wherein the electronics subsystem further comprises a communication subsystem, wherein the communication subsystem establishes communication between the processing subsystem and a mobile user device.

7. The system of claim 6, further comprising a client application executing on the mobile user device, wherein the client application receives an input from the user selecting a mode of operation from a set of modes, wherein the stimulation pattern is determined based on the mode of operation.

8. The system of claim 7, wherein the set of modes comprises a day mode, a night mode, and a music mode.

9. The system of claim 1, wherein the conductive material comprises a metallic plate arranged between the acoustic mesh and the microphone.

10. The system of claim 9, further comprising a grounding clip coupled to the metallic plate and to a substrate to which the microphone is mounted.

11. A system for applying tactile stimulation to a wrist region of a user in a coupled configuration, the system comprising:
 a wrist assembly that encircles the wrist region in the coupled configuration, the wrist assembly comprising:
  a rigid housing defining an aperture;
  a flexible housing defining a notched region that prevents rotation of the rigid housing relative to the wrist region in the coupled configuration;
  an actuation subsystem arranged within the flexible housing, the actuation subsystem comprising:
   a set of multiple actuators that are arranged around a partial circumference of the wrist region in the coupled configuration; and
   a set of actuator coverings coupled to each of the set of multiple actuators;
  an electronics subsystem arranged within the rigid housing, the electronics subsystem comprising:
   a microphone assembly, wherein the microphone assembly comprises:
    an omnidirectional microphone arranged inferior to the aperture;
    an acoustic mesh;
    a conductive component; and
   a processor that processes a set of audio signals sampled at the omnidirectional microphone to produce a stimulation pattern produced at the set of haptic actuators; and
  a client application executing on a user device remote from and in communication with the processing subsystem.

12. The system of claim 11, wherein the conductive component reduces an electrostatic discharge associated with the system.

13. The system of claim 11, wherein each of the set of multiple actuators is a linear resonant actuator.

14. The system of claim 11, wherein the rigid housing defines a set of walls surrounding the microphone, wherein the set of walls prevents sound associated with vibration of the set of multiple actuators from reaching the microphone.

15. The system of claim 14, wherein the client application receives an input from the user selecting a mode of operation from a set of modes, wherein the stimulation pattern is determined based on the mode of operation.

16. The system of claim 15, wherein the set of modes comprises a day mode, a night mode, and a music mode.

17. A method for manufacturing a haptic wristband device for applying haptic stimulation to a wrist region of a user through a set of haptic actuators, the method comprising:
 applying a set of coverings to the set of haptic actuators, wherein the set of coverings prevents collapse of the set of haptic actuators due to an exchange of air into and out of the set of haptic actuators during any or all of a first and second injection molding process;
 performing the first injection molding process, wherein the first injection molding process forms an interior portion of a flexible support subsystem of the haptic wristband device, wherein the interior portion defines a set of cavities that receive the set haptic actuators, and wherein a rigid strain relief component is present during the first injection molding process;
 placing the set of haptic actuators with the set of coverings and a flexible printed circuit board (PCB) within the set of cavities of the interior portion;
 performing a second injection molding process, wherein the second injection molding process forms an exterior portion of the flexible support subsystem, and collectively defines with the interior portion a notched region that prevents rotation of the haptic wristband device while coupled to the user;
 connecting the rigid strain relief to a rigid housing comprising a set of electronic components with a set of screws, wherein the set of screws are oriented perpendicular to a longest length of the flexible PCB.

18. The method of claim 17, wherein the set of coverings comprise stamped metal coverings which cover a set of holes in the set of haptic actuators.

19. The method of claim 17, wherein a rigid strain relief component is present during each of the first and second injection molding processes.

* * * * *